(12) United States Patent
Lin

(10) Patent No.: US 11,994,985 B2
(45) Date of Patent: *May 28, 2024

(54) METHOD AND APPARATUS FOR PERFORMING ACCESS MANAGEMENT OF MEMORY DEVICE IN HOST PERFORMANCE BOOSTER ARCHITECTURE WITH AID OF DEVICE SIDE TABLE INFORMATION ENCODING AND DECODING

(71) Applicant: Silicon Motion, Inc., Hsinchu County (TW)

(72) Inventor: Yu-Chih Lin, Hsinchu County (TW)

(73) Assignee: Silicon Motion, Inc., Hsinchu County (TW)

( * ) Notice: Subject to any disclaimer, the term of this patent is extended or adjusted under 35 U.S.C. 154(b) by 16 days.

This patent is subject to a terminal disclaimer.

(21) Appl. No.: 17/959,320

(22) Filed: Oct. 4, 2022

(65) Prior Publication Data

US 2024/0111670 A1 Apr. 4, 2024

(51) Int. Cl.
*G06F 12/02* (2006.01)

(52) U.S. Cl.
CPC .. *G06F 12/0246* (2013.01); *G06F 2212/7202* (2013.01)

(58) Field of Classification Search
CPC ..... G06F 3/0658; G06F 3/0607; G06F 3/0679
See application file for complete search history.

(56) References Cited

U.S. PATENT DOCUMENTS

| 11,036,625 | B1* | 6/2021 | Balluchi | G06F 12/1063 |
| 2014/0129761 | A1* | 5/2014 | Kwon | G06F 12/0246 |
| | | | | 711/103 |
| 2019/0121576 | A1* | 4/2019 | Jean | G06F 12/14 |

(Continued)

FOREIGN PATENT DOCUMENTS

| CN | 110858180 A | 3/2020 |
| TW | 201314449 A1 | 4/2013 |
| WO | 2022/203238 A1 | 9/2022 |

OTHER PUBLICATIONS

Lin, the specification, including the claims, and drawings in the U.S. Appl. No. 17/959,308, filed Oct. 4, 2022.

*Primary Examiner* — Ryan Bertram
(74) *Attorney, Agent, or Firm* — Winston Hsu

(57) ABSTRACT

A method and apparatus for performing access management of a memory device in a Host Performance Booster (HPB) architecture with aid of device side table information encoding and decoding are provided. The method may include: encoding internal information of the memory device and sending encoded result thereof to a host device, to allow the host device to store the encoded result in a memory within the host device as host-owned encoded device side table information at the host device; generating and storing multiple entries of address mapping control table into a RAM as at least one portion of device side table information at the memory device; decoding partial information of the host-owned encoded device side table information, performing checking operation on decoded result thereof, and selectively using the decoded result to determine physical address associated with logical address; and reading data from the NV memory according to the physical address.

9 Claims, 9 Drawing Sheets

(56) References Cited

U.S. PATENT DOCUMENTS

| | | | | |
|---|---|---|---|---|
| 2020/0371908 A1* | 11/2020 | Cariello | ................ | G06F 3/0679 |
| 2021/0056021 A1* | 2/2021 | Parry | .................... | G06F 3/0679 |
| 2021/0064548 A1* | 3/2021 | Grosz | ................. | G06F 12/0246 |
| 2021/0096984 A1* | 4/2021 | Luo | ..................... | G06F 12/0873 |
| 2021/0181994 A1* | 6/2021 | Jean | ....................... | G06F 3/064 |
| 2021/0240608 A1* | 8/2021 | Jean | ................... | G06F 12/0292 |
| 2021/0248076 A1 | 8/2021 | Musin | | |
| 2022/0004489 A1* | 1/2022 | Cariello | ................ | G06F 3/0604 |
| 2022/0019547 A1* | 1/2022 | Shih | .................... | G06F 12/1009 |
| 2022/0050606 A1* | 2/2022 | Chen | ...................... | G06F 3/061 |
| 2022/0050741 A1* | 2/2022 | Lee | ...................... | G06F 3/0679 |
| 2022/0156181 A1* | 5/2022 | Cariello | ................. | G06F 3/064 |
| 2022/0317905 A1* | 10/2022 | Cao | ...................... | G06F 3/0604 |

* cited by examiner

| Byte\Bit | 7 | 6 | 5 | 4 | 3 | 2 | 1 | 0 |
|---|---|---|---|---|---|---|---|---|
| 0 | Operation Code ||||||||
| 1 | |||||||| |
| 2 | (MSB) ||||||||
| ⋮ | Logical Block Address ||||||||
| 5 | | | | | | | | (LSB) |
| 6 | (MSB) ||||||||
| ⋮ | Hybrid Table Entry ||||||||
| 13 | | | | | | | | (LSB) |
| 14 | Transfer Length ||||||||
| 15 | Control = 00h ||||||||

{ HTE (bytes 6–13) }

| Byte \ Bit | 7 | 6 | 5 | 4 | 3 | 2 | 1 | 0 |
|---|---|---|---|---|---|---|---|---|
| 0 | Operation Code ||||||||
| 1 | |||||||||
| 2 | (MSB) |||||||
| ⋮ | Logical Block Address ||||||||
| 5 | (LSB) |||||||
| 6 | (MSB) |||||||
| ⋮ | Encoded Hybrid Table Entry ||||||||
| 13 | (LSB) |||||||
| 14 | Transfer Length ||||||||
| 15 | Control = 00h ||||||||

EHTE spans bytes 6–13

METHOD AND APPARATUS FOR PERFORMING ACCESS MANAGEMENT OF MEMORY DEVICE IN HOST PERFORMANCE BOOSTER ARCHITECTURE WITH AID OF DEVICE SIDE TABLE INFORMATION ENCODING AND DECODING

BACKGROUND OF THE INVENTION

1. Field of the Invention

The present invention is related to memory control, and more particularly, to a method for performing access management of a memory device in a Host Performance Booster (HPB) architecture with aid of device side table information encoding and decoding, and associated apparatus such as the memory device, a controller thereof, an electronic device comprising the memory device, etc.

2. Description of the Prior Art

A memory device may comprise Flash memory for storing data, and the management of accessing the Flash memory is complicated. The memory device may comprise a RAM for purposes of buffering, management, etc. The storage capacity of the RAM is typically insufficient. The related art tries to correct the problem, but further problems are introduced. Thus, a novel method and associated architecture are needed for solving the problems without introducing any side effect or in a way that is less likely to introduce a side effect.

SUMMARY OF THE INVENTION

It is therefore an objective of the present invention to provide a method for performing access management of a memory device in a Host Performance Booster (HPB) architecture with aid of device side table information encoding and decoding, and to provide associated apparatus such as the memory device, a controller thereof, an electronic device comprising the memory device, etc., in order to solve the above-mentioned problems.

It is another objective of the present invention to provide a method for performing access management of a memory device in a Host Performance Booster (HPB) architecture with aid of device side table information encoding and decoding, and to provide associated apparatus such as the memory device, a controller thereof, an electronic device comprising the memory device, etc., in order to enhance the overall performance.

At least one embodiment of the present invention provides a method for performing access management of a memory device in a Host Performance Booster (HPB) architecture with aid of device side table information encoding and decoding, where the method is applied to a memory controller of the memory device. The memory device may comprise the memory controller and a non-volatile (NV) memory, and the NV memory may comprise at least one NV memory element (e.g., one or more NV memory elements). The method may comprise: utilizing a processing circuit running an encoding procedure within the memory controller to encode internal information of the memory device to generate an encoded result of the internal information of the memory device, and sending the encoded result of the internal information of the memory device to a host device, to allow the host device to store the encoded result of the internal information of the memory device in a memory within the host device as host-owned encoded device side table information at the host device; generating and storing multiple entries of at least one address mapping control table into a random access memory (RAM) within the memory controller as at least one portion of device side table information at the memory device, wherein any entry of the multiple entries of the at least one address mapping control table comprises address information for address mapping, and the address information within said any entry indicates a mapping relationship between a physical address and a logical address, wherein the host-owned encoded device side table information comprises address information respectively carried by the multiple entries of the at least one address mapping control table; in response to a reading request corresponding to at least one logical address from the host device, utilizing the processing circuit running a decoding procedure within the memory controller to decode partial information of the host-owned encoded device side table information to obtain a decoded result of the partial information of the host-owned encoded device side table information, performing at least one checking operation on the decoded result of the partial information of the host-owned encoded device side table information to generate at least one checking result, and selectively using the decoded result of the partial information of the host-owned encoded device side table information to determine at least one physical address associated with the at least one logical address, wherein the reading request carries the partial information of the host-owned encoded device side table information, and the at least one checking result indicates whether the decoded result of the partial information of the host-owned encoded device side table information is reliable; and reading data corresponding to the reading request from the NV memory according to the at least one physical address, for returning the data to the host device.

In addition to the above method, the present invention also provides a memory device, and the memory device comprises an NV memory and a controller. The NV memory is arranged to store information, wherein the NV memory may comprise at least one NV memory element (e.g., one or more NV memory elements). The controller is coupled to the NV memory, and the controller is arranged to control operations of the memory device. In addition, the controller comprises a processing circuit that is arranged to control the controller according to a plurality of host commands from a host device, to allow the host device to access the NV memory through the controller. The controller further comprises a random access memory (RAM) that is coupled to the processing circuit, where the RAM is arranged to provide the controller with internal storage space. For example, the controller utilizes the processing circuit running an encoding procedure within the controller to encode internal information of the memory device to generate an encoded result of the internal information of the memory device, and sends the encoded result of the internal information of the memory device to the host device, to allow the host device to store the encoded result of the internal information of the memory device in a memory within the host device as host-owned encoded device side table information at the host device; the controller generates and stores multiple entries of at least one address mapping control table into the RAM within the controller as at least one portion of device side table information at the memory device, wherein any entry of the multiple entries of the at least one address mapping control table comprises address information for address mapping, and the address information within said any entry indicates a mapping relationship between a physical address and a logical address, wherein the host-owned encoded device side table information comprises address information respectively carried by the multiple entries of the at least one address mapping control table; in response to a reading request corresponding to at least one logical address from the host device, the controller utilizes the processing circuit running a decoding procedure within the controller to decode partial information of the host-owned encoded device side table information to obtain a decoded result of the partial information of the host-owned encoded device side table information, performs at least one checking operation on the decoded result of the partial information of the host-owned encoded device side table information to generate at least one checking result, and selectively uses the decoded result of the partial information of the host-owned encoded device side table information to determine at least one physical address associated with the at least one logical address, wherein the reading request carries the partial information of the host-owned encoded device side table information, and the at least one checking result indicates whether the decoded result of the partial information of the host-owned encoded device side table information is reliable; and the controller reads data corresponding to the reading request from the NV memory according to the at least one physical address, for returning the data to the host device.

According to some embodiments, an associated electronic device is also provided. The electronic device may comprise the above memory device, and may further comprise a host device, and the host device may be coupled to the memory device. The host device may comprise: at least one processor, arranged for controlling operations of the host device; and a power supply circuit, coupled to the at least one processor, arranged for providing power to the at least one processor and the memory device. In addition, the memory device may provide the host device with storage space.

In addition to the above method, the present invention also provides a controller of a memory device, where the memory device comprises the controller and an NV memory. The NV memory may comprise at least one NV memory element (e.g., one or more NV memory elements). In addition, the controller comprises a processing circuit that is arranged to control the controller according to a plurality of host commands from a host device, to allow the host device to access the NV memory through the controller. The controller further comprises a random access memory (RAM) that is coupled to the processing circuit, where the RAM is arranged to provide the controller with internal storage space. For example, the controller utilizes the processing circuit running an encoding procedure within the controller to encode internal information of the memory device to generate an encoded result of the internal information of the memory device, and sends the encoded result of the internal information of the memory device to the host device, to allow the host device to store the encoded result of the internal information of the memory device in a memory within the host device as host-owned encoded device side table information at the host device; the controller generates and stores multiple entries of at least one address mapping control table into the RAM within the controller as at least one portion of device side table information at the memory device, wherein any entry of the multiple entries of the at least one address mapping control table comprises address information for address mapping, and the address information within said any entry indicates a mapping relationship between a physical address and a logical address, wherein the host-owned encoded device side table information comprises address information respectively carried by the multiple entries of the at least one address mapping control table; in response to a reading request corresponding to at least one logical address from the host device, the controller utilizes the processing circuit running a decoding procedure within the controller to decode partial information of the host-owned encoded device side table information to obtain a decoded result of the partial information of the host-owned encoded device side table information, performs at least one checking operation on the decoded result of the partial information of the host-owned encoded device side table information to generate at least one checking result, and selectively uses the decoded result of the partial information of the host-owned encoded device side table information to determine at least one physical address associated with the at least one logical address, wherein the reading request carries the partial information of the host-owned encoded device side table information, and the at least one checking result indicates whether the decoded result of the partial information of the host-owned encoded device side table information is reliable; and the controller reads data corresponding to the reading request from the NV memory according to the at least one physical address, for returning the data to the host device.

According to some embodiments, the apparatus may comprise at least one portion (e.g., a portion or all) of the electronic device. For example, the apparatus may comprise the memory controller within the memory device. In another example, the apparatus may comprise the memory device. In some examples, the apparatus may comprise the electronic device or a host device within the electronic device. In addition, the memory controller of the memory device can control the operations of the memory device according to the method. For example, the memory device can store data for the host device in response to a host command such as a write command from the host device. The memory device can read the stored data in response to another host command such as a read command from the host device, and provide the host device with the data read from the NV memory. Additionally, the NV memory may comprise one or more NV memory elements (e.g., one or more Flash memory dies, or one or more Flash memory chips). In order to enhance the performance of the memory device, the host device may obtain some internal information of the memory device. The host device may send back the internal information previously obtained from the memory device toward the memory device, to allow the memory device to use the internal information, where the memory device may utilize and share the RAM of the host device. According to some embodiments, the memory device can be configured to generate or update the device side table information corresponding to the internal information of the memory device.

The present invention method and apparatus can guarantee that the memory device can operate properly in various situations. For example, the partial information of the host-owned encoded device side table information in the host device may be incorrect (e.g., become out of date), and the present invention method and apparatus can detect this situation and prevent malfunction, etc. of the memory device. For another example, the partial information of the host-owned encoded device side table information in the host device may be altered, and the present invention method and apparatus can detect this situation and prevent some security issues.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
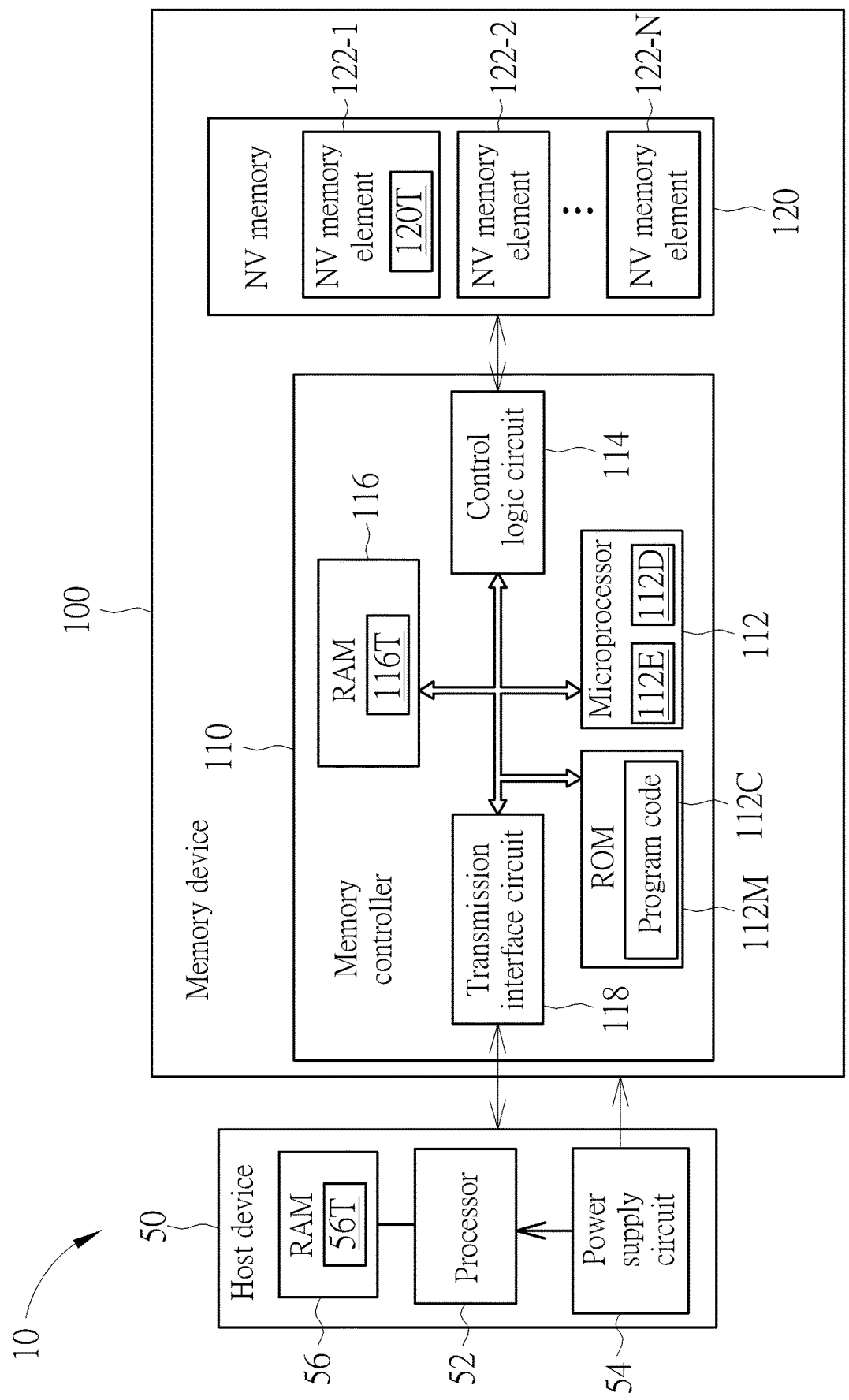
FIG. 1 is a diagram of an electronic device according to an embodiment of the present invention.

FIG. 1 is a diagram of an electronic device 10 according to an embodiment of the present invention, where the electronic device 10 may comprise a host device 50 and a memory device 100. The host device 50 may comprise at least one processor (e.g., one or more processors) which may be collectively referred to as the processor 52, a power supply circuit 54, and at least one random access memory (RAM) (e.g., one or more RAMs, such as a dynamic RAM (DRAM) and/or a static RAM (SRAM)) which may be collectively referred to as the RAM 56), where the processor 52 and the RAM 56 may be coupled to each other through a bus, and may be coupled to the power supply circuit 54 to obtain power. The processor 52 may be arranged to control operations of the host device 50, the power supply circuit 54 may be arranged to provide the processor 52, the RAM 56, and the memory device 100 with power, and output one or more driving voltages to the memory device 100, where the memory device 100 may provide the host device 50 with storage space, and may obtain the one or more driving voltages from the host device 50, to be the power of the memory device 100. Examples of the host device 50 may include, but are not limited to: a multifunctional mobile phone, a tablet computer, a wearable device, and a personal computer such as a desktop computer and a laptop computer. Examples of the memory device 100 may include, but are not limited to: a portable memory device (e.g., a memory card conforming to the SD/MMC, CF, MS or XD specification), a solid state drive (SSD), and various types of embedded memory devices (e.g., am embedded memory device conforming to the UFS or eMMC specification). According to this embodiment, the memory device 100 may comprise a controller such as a memory controller 110, and may further comprise a non-volatile (NV) memory 120, where the controller is arranged to access the NV memory 120, and the NV memory 120 is arranged to store information. The NV memory 120 may comprise at least one NV memory element (e.g., one or more NV memory elements), such as a plurality of NV memory elements 122-1, 122-2, . . . , and 122-N, where "N" may represent a positive integer that is greater than one. For example, the NV memory 120 may be a flash memory, and the plurality of NV memory elements 122-1, 122-2, . . . , and 122-N may be a plurality of flash memory chips or a plurality of flash memory dies, respectively, but the present invention is not limited thereto.

As shown in FIG. 1, the memory controller 110 may comprise a processing circuit such as a microprocessor 112, a storage unit such as a read only memory (ROM) 112M, a control logic circuit 114, a RAM 116 (which may be implemented by way of SRAM, for example), and a transmission interface circuit 118, where at least one portion (e.g., a portion or all) of the above components may be coupled to one another via a bus. The RAM 116 may be arranged to provide the memory controller 110 with internal storage space (for example, may temporarily store information), but the present invention is not limited thereto. In addition, the ROM 112M of this embodiment is arranged to store a program code 112C, and the microprocessor 112 is arranged to execute the program code 112C to control the access of the NV memory 120. Please note that, the program code 112C may also be stored in the RAM 116 or any type of memory. Additionally, the control logic circuit 114 may be arranged to control the NV memory 120. The control logic circuit 114 may comprise an error correction code (ECC) circuit (not shown in FIG. 1), which may perform ECC encoding and ECC decoding, to protect data, and/or perform error correction, and the transmission interface circuit 118 may conform to a specific communications specification (e.g., the Serial Advanced Technology Attachment (SATA) specification, Universal Serial Bus (USB) specification, Peripheral Component Interconnect Express (PCIE) specification, embedded Multi Media Card (eMMC) specification, or Universal Flash Storage (UFS) specification), and may perform communications according to the specific communications specification.

In this embodiment, the host device 50 may transmit a plurality of host commands and corresponding logical addresses to the memory controller 110, to access the NV memory 120 within the memory device 100, indirectly. The memory controller 110 receives the plurality of host commands and the logical addresses, and translates the plurality of host commands into memory operating commands (which may be referred to as operating commands, for brevity), respectively, and further controls the NV memory 120 with the operating commands to perform reading or writing/programing upon the memory units or data pages of specific physical addresses within the NV memory 120, where the physical addresses correspond to the logical addresses. For example, the memory controller 110 may generate or update at least one logical-to-physical (H2F) address mapping table to manage the mapping relationships between the physical addresses and the logical addresses. The NV memory 120 may store the aforementioned at least one H2F address mapping table such as a global H2F address mapping table 120T, for the memory controller 110 to control the memory device 100 to access data in the NV memory 120.

For better comprehension, the global H2F address mapping table 120T may be located in a predetermined region within the NV memory element 122-1, such as a system region, but the present invention is not limited thereto. For example, the global H2F address mapping table 120T may be divided into a plurality of local H2F address mapping tables, and the local H2F address mapping tables may be stored in one or more of the NV memory elements 122-1, 122-2, . . . , and 122-N, and more particularly, may be stored in the NV memory elements 122-1, 122-2, . . . , and 122-N, respectively. When there is a needed, the memory controller 110 may load at least one portion (e.g., a portion or all) of the global H2F address mapping table 120T into the RAM 116 or other memories. For example, the memory controller 110 may load a local H2F address mapping table of the plurality of local H2F address mapping tables into the RAM 116 to be a temporary H2F address mapping table 116T therein, for accessing data in the NV memory 120 according to the local H2F address mapping table, but the present invention is not limited thereto.

In addition, the aforementioned at least one NV memory element (e.g., the one or more NV memory elements such as {122-1, 122-2, . . . , 122-N}) may comprise a plurality of blocks, where the minimum unit that the memory controller 110 may perform operations of erasing data on the NV memory 120 may be a block, and the minimum unit that the memory controller 110 may perform operations of writing data on the NV memory 120 may be a page, but the present invention is not limited thereto. For example, any NV memory element 122-n (where "n" may represent any integer in the interval [1, N]) within the NV memory elements 122-1, 122-2, . . . , and 122-N, may comprise multiple blocks, and a block within the multiple blocks may comprise and record specific number of pages, where the memory controller 110 may access a certain page of a certain block within the multiple blocks according to a block address and a page address. For another example, the NV memory element 122-n may comprise multiple planes, where a plane may comprise a set of blocks such as the aforementioned multiple blocks, and the memory controller 110 may specify a certain plane within the multiple planes according to a plane number, to access a certain page of a certain block of this plane. As the total number of blocks increases, the storage space of the NV memory 120 may become larger.

According to some embodiments, the host device 50 may be regarded as the host side, and the memory device 100 may be regarded as the device side. The memory device 100 may transmit device side table information to the host device 50 to be host-owned device side table information, and a portion of the host-owned device side table information may be sent back to the memory device 100 to be reference information for data accessing, but the present invention is not limited thereto. According to some embodiments, the processing circuit such as the microprocessor 112 may be arranged to perform encoding and decoding regarding the device side table information. For example, the processing circuit such as the microprocessor 112 may be arranged to load and run an encoding procedure 112E and a decoding procedure 112D, respectively, in order to perform encoding and decoding regarding the device side table information, respectively, where the program code 112C may comprise the encoding procedure 112E and the decoding procedure 112D, but the present invention is not limited thereto. For another example, an in-system programing (ISP) code stored in the NV memory 120 (e.g., one or more of the NV memory elements 122-1, 122-2, . . . , and 122-N therein) may comprise the encoding procedure 112E and the decoding procedure 112D. In addition, the memory device 100 may utilize the processing circuit such as the microprocessor 112 (e.g., the microprocessor 112 running the encoding procedure 112E) to encode device side table information to generate encoded device side table information and transmit the encoded device side table information to the host device 50 to be host-owned encoded device side table information, and a portion of the host-owned encoded device side table information may be sent back to the memory device 100. The memory device 100 may utilize the processing circuit such as the microprocessor 112 (e.g., the microprocessor 112 running the decoding procedure 112D) to decode the portion of the host-owned encoded device side table information to obtain a corresponding portion of the device side table information to be reference information for data accessing.

According to some embodiments, the memory controller 110 may transmit a local H2F address mapping table of the plurality of local H2F address mapping tables and corresponding protection information of this local H2F address mapping table (e.g., a physical address of this local H2F address mapping table, such as the latest physical address indicating the latest location where this local H2F address mapping table is stored in the NV memory 120) to the host device 50, for being temporarily stored in the RAM 56 as a host-side table 56T such as a hybrid table (e.g., under control of the processor 52), in order to save the storage space of the RAM 116. In this situation, when accessing data in the memory device 100, the host device 50 may send one or more hybrid table entries of the hybrid table to the memory controller 110, and the memory controller 110 may access the data according to the one or more hybrid table entries for the host device 50, where any hybrid table entry of the one or more hybrid table entries may comprise a physical address and the protection information thereof. If the protection information indicates that this physical address (more particularly, the whole of the hybrid table) is incorrect, the memory controller 110 may load the local H2F address mapping table from the NV memory 120 into the RAM 116 according to the latest physical address of the local H2F address mapping table, to be the temporary H2F address mapping table 116T, and access the data according to the temporary H2F address mapping table 116T in the RAM 116. For example, the memory controller 110 may maintain a latest-table-address table in the RAM 116, and the latest-table-address table may comprise respective latest table addresses of the plurality of local H2F address mapping tables. When the physical address of this local H2F address mapping table does not match the latest physical address of this local H2F address mapping table, the memory controller 110 may determine that this physical address (more particularly, the whole of the hybrid table) is incorrect.

Figures 2, 3:
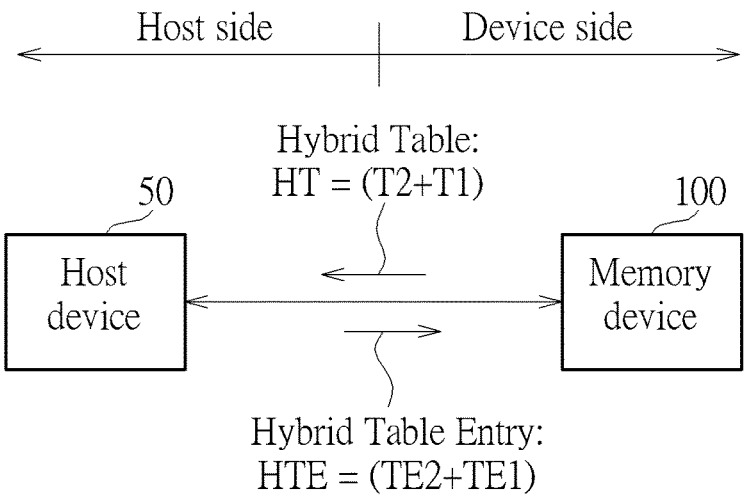
FIG. 2 illustrates a control scheme of a method for performing access management of a memory device such as that shown in FIG. 1 according to an embodiment of the present invention.
FIG. 3 illustrates an example of a Host Performance Booster (HPB) entry packet carrying a corresponding hybrid table entry in the control scheme shown in FIG. 2.

FIG. 2 illustrates a control scheme of a method for performing access management of a memory device such as that shown in FIG. 1 according to an embodiment of the present invention. The memory controller 110 in the memory device 100 may transmit a combination of multiple tables, such as a hybrid table HT comprising two tables T1 and T2, to the host device 50 to be the host-side table 56T (labeled "HT=(T2+T1)" for brevity), where the two tables T1 and T2 may represent the local H2F address mapping table and a protection information table comprising the corresponding protection information of this local H2F address mapping table, respectively. For example, the hybrid table HT may comprise multiple hybrid table entries {HTE} respectively corresponding to a series of logical addresses and may be configured for mapping the series of logical addresses to associated physical addresses recorded in the multiple hybrid table entries {HTE}, respectively. Any hybrid table entry HTE of the multiple hybrid table entries {HTE} of the hybrid table HT (e.g., each hybrid table entry thereof) may comprise a table entry TE1 of the table T1 (e.g., a physical address of the associated physical addresses recorded in the multiple hybrid table entries {HTE}) and a table entry TE2 of the table T2 (e.g., the protection information of this local H2F address mapping table, such as the physical address of this local H2F address mapping table, for checking whether this local H2F address mapping table is correct or checking whether this physical address is correct).

When reading one or more sets of data from the memory device 100, the host device 50 may send at least one packet for indicating the reading request (e.g., a read command packet carrying a read command, a starting logical address, and a data length) to the memory controller 110, and more particularly, may send a Host Performance Booster (HPB) entry packet carrying a corresponding hybrid table entry HTE of the multiple hybrid table entries {HTE} to the memory controller 110, where the corresponding hybrid table entry HTE may comprise a table entry TE1 such as an associated physical address corresponding to the starting logical address and comprise a table entry TE2 such as the protection information of this local H2F address mapping table (labeled "HTE=(TE2+TE1)" for brevity). For example, the aforementioned at least one packet may comprise the HPB entry packet, and may be implemented by way of an HPB READ command, and the HPB READ command may comprise an operation code, a logical block address (LBA) indicating the starting logical address, an HPB entry indicating the corresponding hybrid table entry HTE, a transfer length indicating the data length, etc. According to the table entry TE2 such as the protection information of this local H2F address mapping table, the memory controller 110 may determine whether the table T1 such as this local H2F address mapping table (e.g., the table entry TE1 such as the associated physical address corresponding to the starting logical address) is correct. For example, when the protection information in the table entry TE2, such as the physical address of this local H2F address mapping table, matches the latest physical address of this local H2F address mapping table, the memory controller 110 may determine that this local H2F address mapping table (e.g., this physical address) is correct, and may further access the one or more sets of data in the NV memory 120 according to the table entry TE1 such as the associated physical address corresponding to the starting logical address for the host device 50. For another example, when the protection information in the table entry TE2 does not match the latest physical address of this local H2F address mapping table, the memory controller 110 may determine that this local H2F address mapping table (e.g., this physical address) is incorrect, and may further access the one or more sets of data in the NV memory 120 according to the aforementioned at least one H2F address mapping table such as the global H2F address mapping table 120T (e.g., the correct or latest version of this local H2F address mapping table) for the host device 50. According to some embodiments, the latest physical address of this local H2F address mapping table may be recorded in at least one device side system information table (e.g., one or more device side system information tables) within the memory device 100. For example, the aforementioned at least one device side system information table may be stored in the RAM 116 and/or the NV memory 120.

According to some embodiments, the two tables T1 and T2 may represent at least one local H2F address mapping table (e.g., one or more local H2F address mapping tables of the plurality of local H2F address mapping tables, such as the local H2F address mapping table mentioned in one or more of the above embodiments) and a protection information table comprising the corresponding protection information of the aforementioned at least one local H2F address mapping table, respectively.

According to some embodiments, an HPB entry format of the control scheme shown in FIG. 2 can be suitable for an HPB architecture conforming to the HPB specification. Based on the HPB entry format, in the aforementioned any hybrid table entry HTE of the multiple hybrid table entries {HTE} of the hybrid table HT, the table entry TE1 may have 4 bytes, and the table entry TE2 may also have 4 bytes, but the present invention is not limited thereto.

FIG. 3 illustrates an example of the HPB entry packet carrying the corresponding hybrid table entry HTE in the control scheme shown in FIG. 2. As the HPB entry packet shown in FIG. 3 satisfies some requirements of the HPB READ command as defined in the HPB specification (e.g., HPB 1.0), the HPB entry packet can be utilized as the HPB READ command, where the corresponding hybrid table entry HTE can be utilized as the HPB entry.

TABLE 1

| HPB entry | T2 Content | T1 Content |
| --- | --- | --- |
| 0 | 0x00004030 | 0x0000A000 |
| 1 | 0x00004030 | 0x0000A001 |
| 2 | 0x00004030 | 0x0000A002 |
| 3 | 0x00004030 | 0x0000A003 |
| 4 | 0x00004030 | 0x0000A004 |
| 5 | 0x00004030 | 0x0000A005 |
| 6 | 0x00004030 | 0x0000B009 |
| 7 | 0x00004030 | 0x0000A007 |
| 8 | 0x00004030 | 0x0000A008 |
| 9 | 0x00004030 | 0x0000A009 |
| 10 | 0x00004030 | 0x0000A00A |
| 11 | 0x00004030 | 0x0000B00A |
| 12 | 0x00004030 | 0x0000A00C |
| ... | ... | ... |

Table 1 illustrates an example of the hybrid table HT, where the notation " . . . " indicates that some table contents may be omitted for brevity. The HPB entries {0, 1, . . . } of Table 1 may represent the multiple hybrid table entries {HTE}. In addition, the T1 and T2 contents (e.g., hexadecimal values) of Table 1 may represent the contents of the tables T1 and T2 (e.g., respective table entries {TE1} and {TE2} of the tables T1 and T2), respectively. The physical addresses {0x0000A000, 0x0000A001, . . . } that appear in the T1 contents may be taken as examples of the associated physical addresses corresponding to the series of logical addresses, and the physical address 0x00004030 that repeatedly appears to be the physical addresses {0x00004030, 0x00004030, . . . } in the T2 contents may be taken as an example of the physical address of the local H2F address mapping table.

According to some embodiments, the memory controller 110 (e.g., the microprocessor 112) may encrypt the hybrid table HT to generate an encrypted hybrid table (e.g., an encrypted version of the hybrid table HT) corresponding to the hybrid table HT and send the encrypted hybrid table to the host device 50, for being temporarily stored in the RAM 56 as the host-side table 56T, in order to save the storage space of the RAM 116, but the present invention is not limited thereto. In addition, when accessing data in the memory device 100, the host device 50 may send one or more encrypted hybrid table entries of the encrypted hybrid table, such as the one or more encrypted hybrid table entries corresponding to one or more hybrid table entries of the hybrid table HT, to the memory controller 110, and the memory controller 110 (e.g., the microprocessor 112) may decrypt the one or more encrypted hybrid table entries to obtain the one or more hybrid table entries of the hybrid table HT, and access the data according to the one or more hybrid table entries for the host device 50, where any hybrid table entry of the one or more hybrid table entries may comprise a physical address (e.g., the aforementioned associated physical address corresponding to the starting logical address) and the protection information thereof. For brevity, similar descriptions for these embodiments are not repeated in detail here.

According to some embodiments, performing encoding and decoding regarding the device side table information may be much faster than performing encryption and decryption regarding the device side table information in some situations, where performing encoding and decoding regarding the device side table information may be implemented by way of bitwise exclusive OR (XOR) operations, etc. For better comprehension, encrypting or decrypting a 4-bytes packet may take more than one microsecond (μs), and more particularly, may take several microseconds, and encoding or decoding a 4-bytes packet may merely take a few clock cycles, but the present invention is not limited thereto. For example, any procedure among the encoding procedure 112E and the decoding procedure 112D may comprise a very limited number of lines of program code (e.g., a few lines of program code), to make performing encoding and decoding regarding the device side table information be much faster than performing encryption and decryption regarding the device side table information. In addition, at the device side such as the memory device 100, the memory controller 110 can utilize the processing circuit such as the microprocessor 112 (e.g., the microprocessor 112 running the encoding procedure 112E and the microprocessor 112 running the decoding procedure 112D) to perform encoding and decoding regarding the device side table information, in order to enhance the overall performance while protecting the device side table information. For brevity, similar descriptions for these embodiments are not repeated in detail here.

Figures 4, 5:
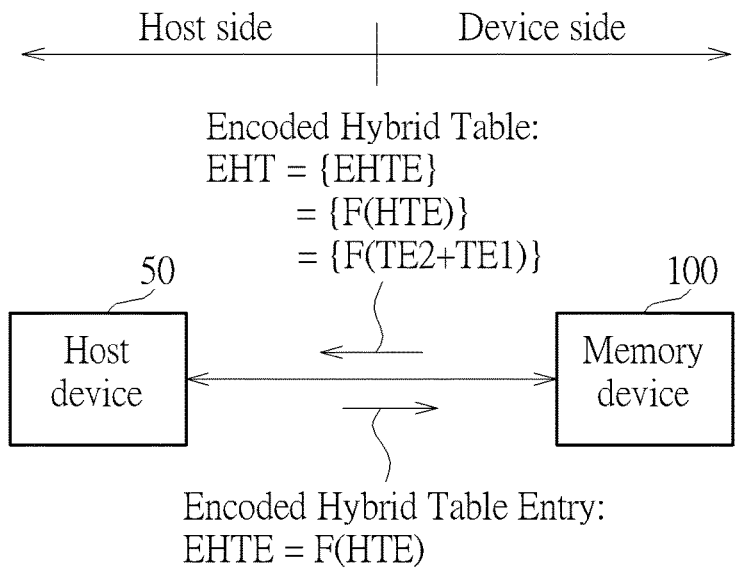
FIG. 4 illustrates a first control scheme of a method for performing access management of a memory device such as that shown in FIG. 1 in an HPB architecture with aid of device side table information encoding and decoding according to an embodiment of the present invention.
FIG. 5 illustrates an example of an HPB entry packet carrying a corresponding encoded hybrid table entry in the first control scheme shown in FIG. 4.

FIG. 4 illustrates a first control scheme of a method for performing access management of a memory device such as that shown in FIG. 1 in an HPB architecture with aid of device side table information encoding and decoding according to an embodiment of the present invention. For better comprehension, the memory controller 110 may encode the hybrid table HT by utilizing the processing circuit such as the microprocessor 112 (e.g., the microprocessor 112 running the encoding procedure 112E), to generate an encoded hybrid table EHT (e.g., an encoded version of the hybrid table HT) corresponding to the hybrid table HT, and send the encoded hybrid table EHT to the host device 50, for being temporarily stored in the RAM 56 as the host-side table 56T, in order to save the storage space of the RAM 116, but the present invention is not limited thereto. In addition, when accessing data in the memory device 100, the host device 50 may send one or more encoded hybrid table entries of the encoded hybrid table EHT, such as the one or more encoded hybrid table entries corresponding to one or more hybrid table entries of the hybrid table HT, to the memory controller 110, and the memory controller 110 may decode the one or more encoded hybrid table entries by utilizing the processing circuit such as the microprocessor 112 (e.g., the microprocessor 112 running the decoding procedure 112D), to obtain the one or more hybrid table entries of the hybrid table HT, and access the data according to the one or more hybrid table entries for the host device 50, where any hybrid table entry of the one or more hybrid table entries may comprise a physical address (e.g., the aforementioned associated physical address corresponding to the starting logical address) and the protection information thereof.

When encoding the hybrid table HT to generate the encoded hybrid table EHT (e.g., the encoded version of the hybrid table HT), the memory controller 110 may encode the multiple hybrid table entries {HTE} of the hybrid table HT, respectively, to generate multiple encoded hybrid table entries {EHTE} of the encoded hybrid table EHT, such as the encoded versions of the multiple hybrid table entries {HTE} of the hybrid table HT, respectively. For example, the memory controller 110 may utilize the processing circuit such as the microprocessor 112 (e.g., the microprocessor 112 running the encoding procedure 112E) to encode the multiple hybrid table entries {HTE} of the hybrid table HT with an encoding function F( ) to generate multiple encoded results {F(HTE)} of the multiple hybrid table entries {HTE} to be the multiple encoded hybrid table entries {EHTE} of the encoded hybrid table EHT, respectively, where any encoded hybrid table entry EHTE among the multiple encoded hybrid table entries {EHTE} may be regarded as an encoded result F(HTE) of a corresponding hybrid table entry HTE among the multiple hybrid table entries {HTE}, such as the encoded result F(TE2+TE1) of the combination (TE2+TE1) of the table entries TE2 and TE1 within the corresponding hybrid table entry HTE. As a result, when sending the encoded hybrid table EHT to the host device 50, the memory controller 110 may send the multiple encoded hybrid table entries {EHTE} to the host device 50, and more particularly, send the multiple encoded results {F(HTE)} such as the respective encoded results {F(TE2+TE1)} of the respective combinations {(TE2+TE1)} of the respective table entries {(TE2, TE1)} of the multiple hybrid table entries {HTE} to the host device 50 (labeled "EHT={EHTE}={F(HTE)}={F(TE2+TE1)}" for brevity).

In addition, when accessing the data in the memory device 100, the host device 50 may send the one or more encoded hybrid table entries such as a corresponding encoded hybrid table entry EHTE (e.g., the encoded result F(HTE) of the corresponding hybrid table entry HTE) among the multiple encoded hybrid table entries {EHTE} to the memory controller 110 (labeled "EHTE=F(HTE)" for brevity), and the memory controller 110 may decode the one or more encoded hybrid table entries such as the corresponding encoded hybrid table entry EHTE by utilizing the processing circuit such as the microprocessor 112 (e.g., the microprocessor 112 running the decoding procedure 112D), to obtain the one or more hybrid table entries such as the corresponding hybrid table entry HTE, and access the data according to the one or more hybrid table entries such as the corresponding hybrid table entry HTE for the host device 50. For brevity, similar descriptions for this embodiment are not repeated in detail here.

FIG. 5 illustrates an example of an HPB entry packet carrying the corresponding encoded hybrid table entry EHTE in the first control scheme shown in FIG. 4. As the HPB entry packet shown in FIG. 5 satisfies some requirements of the HPB READ command as defined in the HPB specification (e.g., HPB 1.0), the HPB entry packet can be utilized as the HPB READ command, where the corresponding encoded hybrid table entry EHTE can be utilized as the HPB entry.

Figure 6:
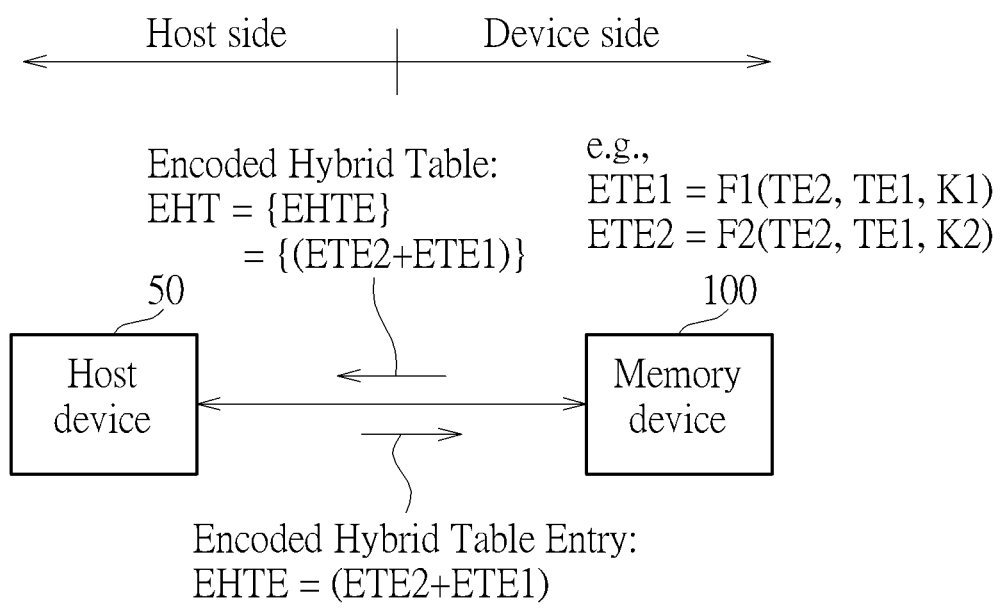
FIG. 6 illustrates a second control scheme of the method for performing access management of the memory device in the HPB architecture with aid of device side table information encoding and decoding according to an embodiment of the present invention.

FIG. 6 illustrates a second control scheme of the method for performing access management of the memory device in the HPB architecture with aid of device side table information encoding and decoding according to an embodiment of the present invention. After encoding the multiple hybrid table entries {HTE} of the hybrid table HT to generate the multiple encoded hybrid table entries {EHTE} of the encoded hybrid table EHT, respectively, the memory controller 110 (e.g., the processing circuit such as the microprocessor 112, in particular, the microprocessor 112 running the encoding procedure 112E) may make the aforementioned any encoded hybrid table entry EHTE among the multiple encoded hybrid table entries {EHTE} comprise multiple encoded table entries such as the encoded table entry ETE1 and the encoded table entry ETE2 (labeled "EHT={EHTE}={(ETE2+ETE1)}" for brevity). For example, during encoding a certain hybrid table entry HTE among the multiple hybrid table entries {HTE} to generate the aforementioned any encoded hybrid table entry EHTE among the multiple encoded hybrid table entries {EHTE}, the memory controller 110 may encode the table entries TE2 and TE1 within this hybrid table entry HTE with multiple encoding functions such as the encoding functions F1( ) and F2( ) to generate the encoded table entry ETE1 and the encoded table entry ETE2 within the aforementioned any encoded hybrid table entry EHTE as follows:

$ETE1=F1(TE2,TE1,K1)$; and $ETE2=F2(TE2,TE1,K2)$;

where the symbols K1 and K2 may represent a first predetermined key and a second predetermined key, respectively, but the present invention is not limited thereto. According to some embodiments, one of the table entries TE2 and TE1 may be omitted in any encoding function among the encoding functions F1( ) and F2( ). For example, in a situation where the table entry TE2 is omitted in the encoding function F1( ), ETE1=F1(TE1, K1) and ETE2=F2(TE2, TE1, K2). For another example, in a situation where the table entry TE2 is omitted in the encoding function F2( ), ETE1=F1(TE2, TE1, K1) and ETE2=F2(TE1, K2). For yet another example, in a situation where the table entry TE1 is omitted in the encoding function F1( ), ETE1=F1(TE2, K1) and ETE2=F2(TE2, TE1, K2). For still another example, in a situation where the table entry TE1 is omitted in the encoding function F2( ), ETE1=F1(TE2, TE1, K1) and ETE2=F2(TE2, K2).

In addition, when accessing the data in the memory device 100, the host device 50 may send the one or more encoded hybrid table entries such as the corresponding encoded hybrid table entry EHTE (e.g., the combination (ETE2+ETE1) of the encoded table entries ETE2 and ETE1 within the corresponding encoded hybrid table entry EHTE) among the multiple encoded hybrid table entries {EHTE} to the memory controller 110 (labeled "EHTE=(ETE2+ETE1)" for brevity), and the memory controller 110 may decode the one or more encoded hybrid table entries such as the corresponding encoded hybrid table entry EHTE by utilizing the processing circuit such as the microprocessor 112 (e.g., the microprocessor 112 running the decoding procedure 112D), to obtain the one or more hybrid table entries such as the corresponding hybrid table entry HTE, and access the data according to the one or more hybrid table entries such as the corresponding hybrid table entry HTE for the host device 50. For brevity, similar descriptions for this embodiment are not repeated in detail here.

According to some embodiments, the length of the aforementioned any hybrid table entry HTE of the multiple hybrid table entries {HTE} may be equal to a predetermined hybrid table entry byte count such as eight (e.g., the aforementioned any hybrid table entry HTE of the multiple hybrid table entries {HTE} has 8 bytes) and the length of each table entry among the table entries TE1 and TE2 of the aforementioned any hybrid table entry HTE may be equal to a predetermined table entry byte count such as a half of the predetermined hybrid table entry byte count (e.g., each table entry among the table entries TE1 and TE2 of the aforementioned any hybrid table entry HTE of the multiple hybrid table entries {HTE} has 4 bytes). In addition, the length of the aforementioned any encoded hybrid table entry EHTE among the multiple encoded hybrid table entries {EHTE} may be equal to a predetermined encoded hybrid table entry byte count such as eight (e.g., the aforementioned any encoded hybrid table entry EHTE among the multiple encoded hybrid table entries {EHTE} may have 8 bytes) and the length of each encoded table entry among the encoded table entries ETE1 and ETE2 of the aforementioned any encoded hybrid table entry EHTE among the multiple encoded hybrid table entries {EHTE} may be equal to a predetermined encoded table entry byte count such as a half of the predetermined encoded hybrid table entry byte count (e.g., each encoded table entry among the encoded table entries ETE1 and ETE2 of the aforementioned any encoded hybrid table entry EHTE among the multiple encoded hybrid table entries {EHTE} may have 4 bytes), where the predetermined encoded hybrid table entry byte count may be equal to the predetermined hybrid table entry byte count. For brevity, similar descriptions for these embodiments are not repeated in detail here.

According to some embodiments, the predetermined hybrid table entry byte count, the predetermined table entry byte count, the predetermined encoded hybrid table entry byte count, and/or the predetermined encoded table entry byte count may vary. For brevity, similar descriptions for these embodiments are not repeated in detail here.

According to some embodiments, in a situation where the processing circuit such as the microprocessor 112 is running any procedure among the encoding procedure 112E and the decoding procedure 112D, the processing circuit such as the microprocessor 112 can be configured to comprise multiple sub-circuits such as multiple calculation sub-circuits. For example, when the processing circuit such as the microprocessor 112 is running the encoding procedure 112E, one calculation sub-circuit among the multiple calculation sub-circuits may operate according to the encoding function F1( ), and another calculation sub-circuit among the multiple calculation sub-circuits may operate according to the encoding function F2( ). For brevity, similar descriptions for these embodiments are not repeated in detail here.

According to some embodiments, the aforementioned any hybrid table entry HTE of the multiple hybrid table entries {HTE} may represent an 8-bytes hybrid table entry {4B_H, 4B_L}, and the table entries TE2 and TE1 of the aforementioned any hybrid table entry HTE may represent 4-bytes table entries 4B_H and 4B_L, respectively, such as the higher 4 bytes and the lower 4 bytes within the 8-bytes hybrid table entry {4B_H, 4B_L}, respectively. In addition, the aforementioned any encoded hybrid table entry EHTE among the multiple encoded hybrid table entries {EHTE} may represent an 8-bytes encoded hybrid table entry {4B_H*, 4B_L*}, and the encoded table entries ETE2 and ETE1 of the aforementioned any encoded hybrid table entry EHTE may represent 4-bytes encoded table entries 4B_H* and 4B_L*, respectively, such as the higher 4 bytes and the lower 4 bytes within the 8-bytes encoded hybrid table entry {4B_H*, 4B_L*}, respectively. Additionally, the second predetermined key K2 and the first predetermined key K1 may represent 4-bytes keys Key_H and Key_L, respectively, such as the higher 4 bytes and the lower 4 bytes within the 8-bytes combined key {Key_H, Key_L}, respectively. For example, assuming that the symbol "i" may represent a non-negative integer, during encoding the $i^{th}$ hybrid table entry HTE(i) (e.g., the 8-bytes hybrid table entry {4B_H, 4B_L}) among the multiple hybrid table entries {HTE} to generate the $i^{th}$ encoded hybrid table entry EHTE(i) (e.g., the 8-bytes encoded hybrid table entry {4B_H*, 4B_L*}) among the multiple encoded hybrid table entries {EHTE}, the memory controller 110 may encode the table entries TE2(i) and TE1(i) (e.g., the 4-bytes table entries 4B_H and 4B_L) within the $i^{th}$ hybrid table entry HTE(i) (e.g., the 8-bytes hybrid table entry {4B_H, 4B_L}) with the multiple encoding functions such as the encoding functions F1( ) and F2( ) to generate the encoded table entries ETE2(i) and ETE1(i) (e.g., the 4-bytes encoded table entries 4B_H* and 4B_L*) within the $i^{th}$ encoded hybrid table entry EHTE(i) (e.g., the 8-bytes encoded hybrid table entry {4B_H*, 4B_L*}) as follows:

$$ETE1(i)=F1(TE2(i),TE1(i),K1); \text{ and}$$

$$ETE2(i)=F2(TE2(i),TE1(i),K2);$$

where the above equations may be rewritten as follows:

$$4B\_L^*=F1(4B\_H,4B\_L,K1); \text{ and}$$

$$4B\_H^*=F2(4B\_H,4B\_L,K2);$$

but the present invention is not limited thereto. According to some embodiments, one of the table entries TE2(i) and TE1(i) (e.g., the 4-bytes table entries 4B_H and 4B_L) may be omitted in any encoding function among the encoding functions F1( ) and F2( ), and therefore, one encoded table entry among the encoded table entries ETE2(i) and ETE1(i) (e.g., the 4-bytes encoded table entries 4B_H* and 4B_L*) within the $i^{th}$ encoded hybrid table entry EHTE(i) (e.g., the 8-bytes encoded hybrid table entry {4B_H*, 4B_L*}) may be equal to a function of all table entries among the table entries TE2(i) and TE1(i) (e.g., the 4-bytes table entries 4B_H and 4B_L) within the $i^{th}$ hybrid table entry HTE(i) (e.g., the 8-bytes hybrid table entry {4B_H, 4B_L}) as well as one predetermined key among the second predetermined key K2 and the first predetermined key K1, and the other encoded table entry among the encoded table entries ETE2(i) and ETE1(i) (e.g., the 4-bytes encoded table entries 4B_H* and 4B_L*) within the $i^{th}$ encoded hybrid table entry EHTE(i) (e.g., the 8-bytes encoded hybrid table entry {4B_H*, 4B_L*}) may be equal to a function of one table entry among the table entries TE2(i) and TE1(i) (e.g., the 4-bytes table entries 4B_H and 4B_L) within the $i^{th}$ hybrid table entry HTE(i) (e.g., the 8-bytes hybrid table entry {4B_H, 4B_L}) as well as the other predetermined key among the second predetermined key K2 and the first predetermined key K1. For example, in a situation where the table entry TE2(i) is omitted in the encoding function F1( ):

$$ETE1(i)=F1(TE1(i),K1); \text{ and}$$

$$ETE2(i)=F2(TE2(i),TE1(i),K2);$$

where the above equations may be rewritten as follows:

$$4B\_L^*=F1(4B\_L,K1); \text{ and}$$

$$4B\_H^*=F2(4B\_H,4B\_L,K2).$$

For another example, in a situation where the table entry TE2(i) is omitted in the encoding function F2( ):

$$ETE1(i)=F1(TE2(i),TE1(i),K1); \text{ and}$$

$$ETE2(i)=F2(TE1(i),K2);$$

where the above equations may be rewritten as follows:

$$4B\_L^*=F1(4B\_H,4B\_L,K1); \text{ and}$$

$$4B\_H^*=F2(4B\_L,K2).$$

For yet another example, in a situation where the table entry TE1(i) is omitted in the encoding function F1( ):

$$ETE1(i)=F1(TE2(i),K1); \text{ and}$$

$$ETE2(i)=F2(TE2(i),TE1(i),K2);$$

where the above equations may be rewritten as follows:

$$4B\_L^*=F1(4B\_H,K1) \text{ and}$$

$$4B\_H^*=F2(4B\_H,4B\_L,K2).$$

For still another example, in a situation where the table entry TE1(i) is omitted in the encoding function F2( ):

$$ETE1(i)=F1(TE2(i),TE1(i),K1); \text{ and}$$

$$ETE2(i)=F2(TE2(i),K2);$$

where the above equations may be rewritten as follows:

$$4B\_L^*=F1(4B\_H,4B\_L,K1); \text{ and}$$

$$4B\_H^*=F2(4B\_H,K2).$$

For brevity, similar descriptions for these embodiments are not repeated in detail here.

Figure 7:
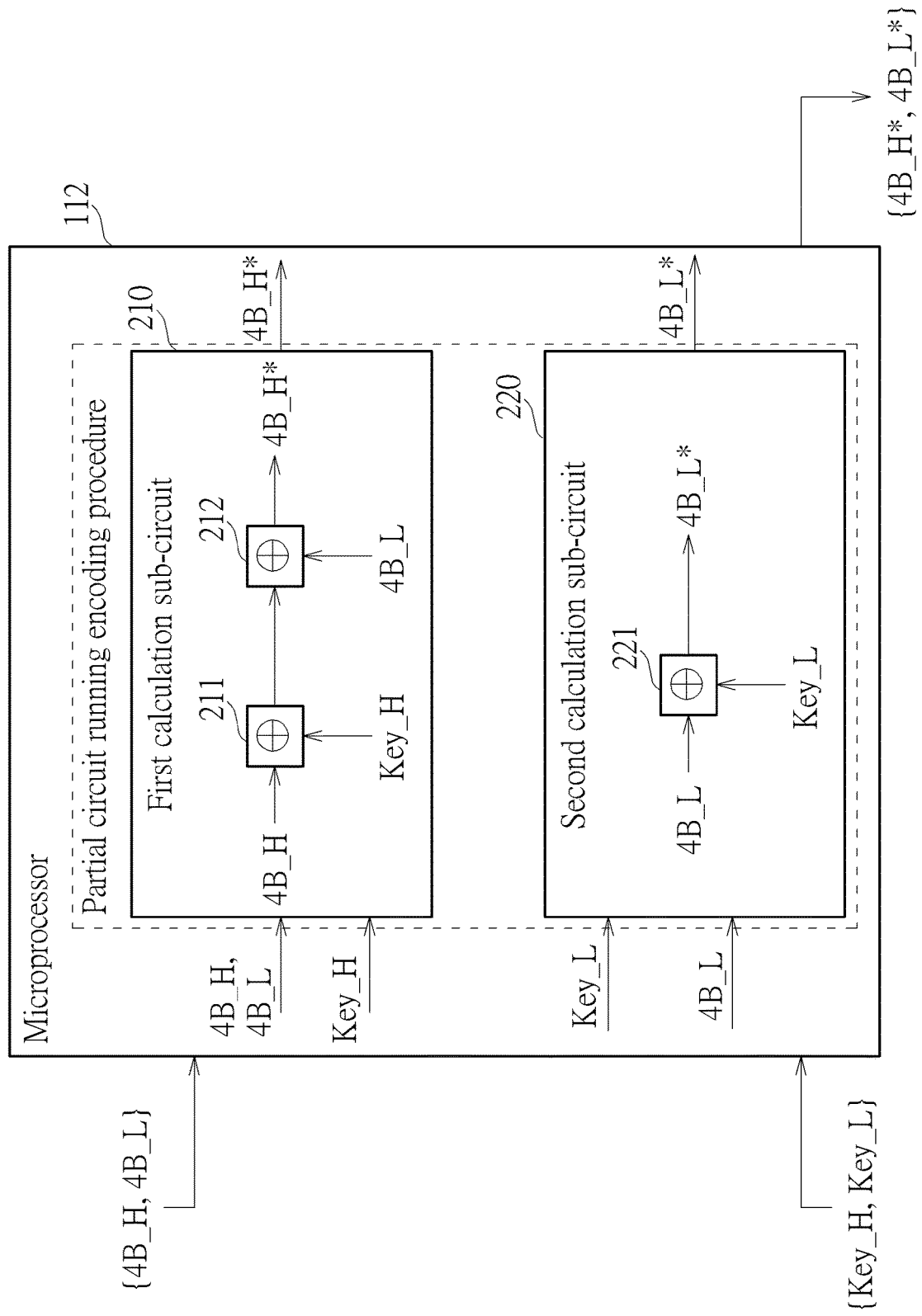
FIG. 7 illustrates an encoding control scheme of the method for performing access management of the memory device in the HPB architecture with aid of device side table information encoding and decoding according to an embodiment of the present invention.

FIG. 7 illustrates an encoding control scheme of the method for performing access management of the memory device in the HPB architecture with aid of device side table information encoding and decoding according to an embodiment of the present invention. When the processing circuit such as the microprocessor 112 is running the encoding procedure 112E, at least one partial circuit running the encoding procedure 112E within the microprocessor 112 can be configured to comprise a first calculation sub-circuit 210 and a second calculation sub-circuit 220, where the first calculation sub-circuit 210 may comprise multiple bitwise XOR calculation circuits such as the bitwise XOR calculation circuits 211 and 212 arranged to perform bitwise XOR operations, respectively, and the second calculation sub-circuit 220 may comprise at least one bitwise XOR calculation circuit such as the bitwise XOR calculation circuit 221 arranged to perform a bitwise XOR operation, but the present invention is not limited thereto.

As shown in FIG. 7, the microprocessor 112 can be arranged to input the 8-bytes hybrid table entry {4B_H, 4B_L} and the 8-bytes combined key {Key_H, Key_L} into the aforementioned at least one partial circuit running the encoding procedure 112E, and can be arranged to obtain the 8-bytes encoded hybrid table entry {4B_H*, 4B_L*} from the aforementioned at least one partial circuit running the encoding procedure 112E and output the 8-bytes encoded hybrid table entry {4B_H*, 4B_L*}. In addition, the first calculation sub-circuit 210 (e.g., the bitwise XOR calculation circuits 211 and 212) can be arranged to perform bitwise XOR operations according to the 4-bytes table entries 4B_H and 4B_L and the 4-bytes key Key_H to generate the 4-bytes encoded table entry 4B_H*, for example, according to the following equation:

$$4B\_H^* = 4B\_H \oplus Key\_H \oplus 4B\_L;$$

where the symbol "$\oplus$" may represent a bitwise XOR operation, but the present invention is not limited thereto. Additionally, the second calculation sub-circuit 220 (e.g., the bitwise XOR calculation circuit 221) can be arranged to perform a bitwise XOR operation according to the 4-bytes table entry 4B_L and the 4-bytes key Key_L to generate the 4-bytes encoded table entry 4B_L*, for example, according to the following equation:

$$4B\_L^* = 4B\_L \oplus Key\_L;$$

but the present invention is not limited thereto. For brevity, similar descriptions for this embodiment are not repeated in detail here.

According to some embodiments, during decoding the $i^{th}$ encoded hybrid table entry EHTE(i) (e.g., the 8-bytes encoded hybrid table entry {4B_H*, 4B_L*}) among the multiple encoded hybrid table entries {EHTE} to obtain the $i^{th}$ hybrid table entry HTE(i) (e.g., the 8-bytes hybrid table entry {4B_H, 4B_L}) among the multiple hybrid table entries {HTE}, the memory controller 110 may decode the encoded table entries ETE2(i) and ETE1(i) (e.g., the 4-bytes encoded table entries 4B_H* and 4B_L*) within the $i^{th}$ encoded hybrid table entry EHTE(i) (e.g., the 8-bytes encoded hybrid table entry {4B_H*, 4B_L*}) to generate the table entries TE2(i) and TE1(i) (e.g., the 4-bytes table entries 4B_H and 4B_L) within the $i^{th}$ hybrid table entry HTE(i) (e.g., the 8-bytes hybrid table entry {4B_H, 4B_L}) with multiple decoding functions such as the decoding functions F1'( ) and F2'( ) as follows:

$$TE1(i) = F1'(ETE2(i), ETE1(i), K1, K2); \text{ and}$$

$$TE2(i) = F2'(ETE2(i), ETE1(i), K1, K2);$$

where the above equations may be rewritten as follows:

$$4B\_L = F1'(4B\_H^*, 4B\_L^*, K1, K2); \text{ and}$$

$$4B\_H = F2'(4B\_H^*, 4B\_L^*, K1, K2);$$

but the present invention is not limited thereto. According to some embodiments, one of the encoded table entries ETE2(i) and ETE1(i) (e.g., the 4-bytes encoded table entries 4B_H* and 4B_L*) and/or one of the predetermined keys K2 and K1 may be omitted in any decoding function among the decoding functions F1'( ) and F2'( ), and therefore, one table entry among the table entries TE2(i) and TE1(i) (e.g., the 4-bytes table entries 4B_H and 4B_L) within the $i^{th}$ hybrid table entry HTE(i) (e.g., the 8-bytes hybrid table entry {4B_H, 4B_L}) may be equal to a function of all encoded table entries among the encoded table entries ETE2(i) and ETE1(i) (e.g., the 4-bytes encoded table entries 4B_H* and 4B_L*) within the $i^{th}$ encoded hybrid table entry EHTE(i) (e.g., the 8-bytes encoded hybrid table entry {4B_H*, 4B_L*}) as well as one or more predetermined keys among the second predetermined key K2 and the first predetermined key K1, and the other table entry among the table entries TE2(i) and TE1(i) (e.g., the 4-bytes table entries 4B_H and 4B_L) within the $i^{th}$ hybrid table entry HTE(i) (e.g., the 8-bytes hybrid table entry {4B_H, 4B_L}) may be equal to a function of one encoded table entry among the encoded table entries ETE2(i) and ETE1(i) (e.g., the 4-bytes encoded table entries 4B_H* and 4B_L*) within the $i^{th}$ encoded hybrid table entry EHTE(i) (e.g., the 8-bytes encoded hybrid table entry {4B_H*, 4B_L*}) as well as one or more predetermined keys among the second predetermined key K2 and the first predetermined key K1. For example, in a situation where the encoded table entry ETE2(i) is omitted in the decoding function F1'( ):

$$TE1(i) = F1'(ETE1(i), K1, K2); \text{ and}$$

$$TE2(i) = F2'(ETE2(i), ETE1(i), K1, K2);$$

where the above equations may be rewritten as follows:

$$4B\_L = F1'(4B\_L^*, K1, K2); \text{ and}$$

$$4B\_H = F2'(4B\_H^*, 4B\_L^*, K1, K2).$$

For another example, in a situation where the encoded table entry ETE2(i) is omitted in the decoding function F2'( ):

$$TE1(i) = F1'(ETE2(i), ETE1(i), K1, K2); \text{ and}$$

$$TE2(i) = F2'(ETE1(i), K1, K2);$$

where the above equations may be rewritten as follows:

$$4B\_L = F1'(4B\_H^*, 4B\_L^*, K1, K2); \text{ and}$$

$$4B\_H = F2'(4B\_L^*, K1, K2).$$

For yet another example, in a situation where the encoded table entry ETE1(i) is omitted in the decoding function F1'( ):

$$TE1(i) = F1'(ETE2(i), K1, K2); \text{ and}$$

$$TE2(i) = F2'(ETE2(i), ETE1(i), K1, K2);$$

where the above equations may be rewritten as follows:

$$4B\_L = F1'(4B\_H^*, K1, K2); \text{ and}$$

$$4B\_H = F2'(4B\_H^*, 4B\_L^*, K1, K2).$$

For still another example, in a situation where the encoded table entry ETE1(i) is omitted in the decoding function F2'( ):

$$TE1(i) = F1'(ETE2(i), ETE1(i), K1, K2); \text{ and}$$

$$TE2(i) = F2'(ETE2(i), K1, K2);$$

where the above equations may be rewritten as follows:

$$4B\_L = F1'(4B\_H^*, 4B\_L^*, K1, K2); \text{ and}$$

$$4B\_H = F2'(4B\_H^*, K1, K2).$$

For brevity, similar descriptions for these embodiments are not repeated in detail here.

Figure 8:
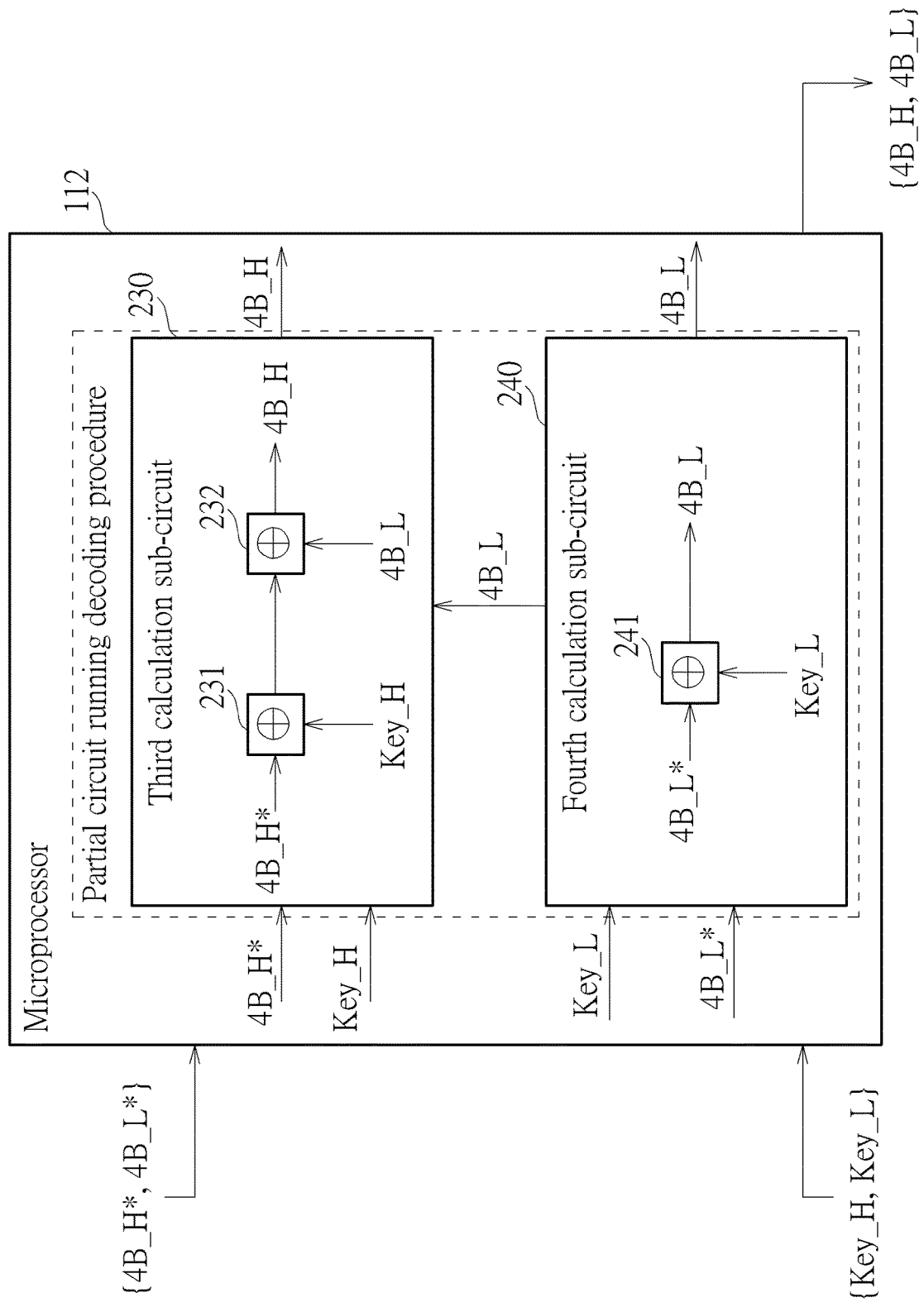
FIG. 8 illustrates a first decoding control scheme of the method for performing access management of the memory device in the HPB architecture with aid of device side table information encoding and decoding according to an embodiment of the present invention.

FIG. 8 illustrates a first decoding control scheme of the method for performing access management of the memory device in the HPB architecture with aid of device side table information encoding and decoding according to an embodiment of the present invention. When the processing circuit such as the microprocessor 112 is running the decoding procedure 112D, at least one partial circuit running the decoding procedure 112D within the microprocessor 112 can be configured to comprise a third calculation sub-circuit 230 and a fourth calculation sub-circuit 240, where the third calculation sub-circuit 230 may comprise multiple bitwise XOR calculation circuits such as the bitwise XOR calculation circuits 231 and 232 arranged to perform bitwise XOR operations, respectively, and the fourth calculation sub-circuit 240 may comprise at least one bitwise XOR calculation circuit such as the bitwise XOR calculation circuit 241 arranged to perform a bitwise XOR operation, but the present invention is not limited thereto.

As shown in FIG. 8, the microprocessor 112 can be arranged to input the 8-bytes encoded hybrid table entry {4B_H*, 4B_L*} and the 8-bytes combined key {Key_H, Key_L} into the aforementioned at least one partial circuit running the decoding procedure 112D, and can be arranged to obtain the 8-bytes hybrid table entry {4B_H, 4B_L} from the aforementioned at least one partial circuit running the decoding procedure 112D and output the 8-bytes hybrid table entry {4B_H, 4B_L}. In addition, the third calculation sub-circuit 230 (e.g., the bitwise XOR calculation circuits 231 and 232) can be arranged to perform bitwise XOR operations according to the 4-bytes encoded table entry 4B_H*, the 4-bytes table entry 4B_L and the 4-bytes key Key_H to generate the 4-bytes table entry 4B_H, for example, according to the following equation:

$$4B\_H = 4B\_H^* \oplus (Key\_H \oplus 4B\_L);$$

where the 4-bytes table entry 4B_L can be obtained from the fourth calculation sub-circuit 240, but the present invention is not limited thereto. Additionally, the fourth calculation sub-circuit 240 (e.g., the bitwise XOR calculation circuit 241) can be arranged to perform a bitwise XOR operation according to the 4-bytes encoded table entry 4B_L* and the 4-bytes key Key_L to generate the 4-bytes table entry 4B_L, for example, according to the following equation:

$$4B\_L = 4B\_L^* \oplus (Key\_L);$$

but the present invention is not limited thereto. For brevity, similar descriptions for this embodiment are not repeated in detail here.

Figure 9:
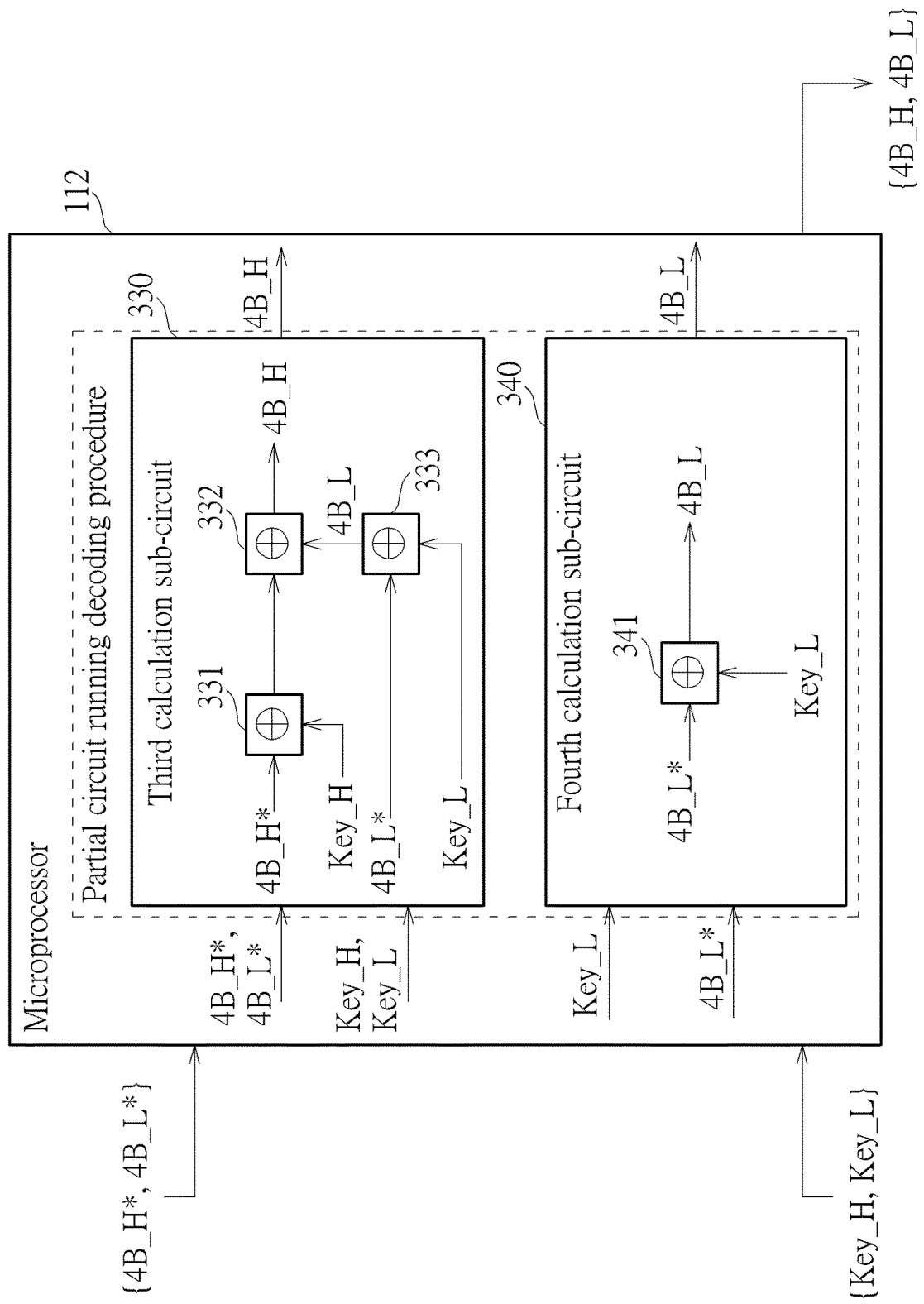
FIG. 9 illustrates a second decoding control scheme of the method for performing access management of the memory device in the HPB architecture with aid of device side table information encoding and decoding according to an embodiment of the present invention.

FIG. 9 illustrates a second decoding control scheme of the method for performing access management of the memory device in the HPB architecture with aid of device side table information encoding and decoding according to an embodiment of the present invention. When the processing circuit such as the microprocessor 112 is running the decoding procedure 112D, the aforementioned at least one partial circuit running the decoding procedure 112D within the microprocessor 112 can be configured to comprise a third calculation sub-circuit 330 and a fourth calculation sub-circuit 340, where the third calculation sub-circuit 330 may comprise multiple bitwise XOR calculation circuits such as the bitwise XOR calculation circuits 331, 332 and 333 arranged to perform bitwise XOR operations, respectively, and the fourth calculation sub-circuit 340 may comprise at least one bitwise XOR calculation circuit such as the bitwise XOR calculation circuit 341 arranged to perform a bitwise XOR operation, but the present invention is not limited thereto.

As shown in FIG. 9, the microprocessor 112 can be arranged to input the 8-bytes encoded hybrid table entry {4B_H*, 4B_L*} and the 8-bytes combined key {Key_H, Key_L} into the aforementioned at least one partial circuit running the decoding procedure 112D, and can be arranged to obtain the 8-bytes hybrid table entry {4B_H, 4B_L} from the aforementioned at least one partial circuit running the decoding procedure 112D and output the 8-bytes hybrid table entry {4B_H, 4B_L}. In addition, the third calculation sub-circuit 330 (e.g., the bitwise XOR calculation circuits 331, 332 and 333) can be arranged to perform bitwise XOR operations according to the 4-bytes encoded table entries 4B_H* and 4B_L* and the 4-bytes keys Key_H and Key_L to generate the 4-bytes table entry 4B_H, for example, according to the following equation:

$$4B\_H = 4B\_H^* \oplus (Key\_H \, e(4B\_L^* \oplus Key\_L);$$

where the third calculation sub-circuit 340 can calculate the 4-bytes table entry 4B_L by itself, but the present invention is not limited thereto. Additionally, the fourth calculation sub-circuit 340 (e.g., the bitwise XOR calculation circuit 341) can be arranged to perform a bitwise XOR operation according to the 4-bytes encoded table entry 4B_L* and the 4-bytes key Key_L to generate the 4-bytes table entry 4B_L, for example, according to the following equation:

$$4B\_L = 4B\_L^* \oplus Key\_L;$$

but the present invention is not limited thereto. For brevity, similar descriptions for this embodiment are not repeated in detail here.

Figure 10:
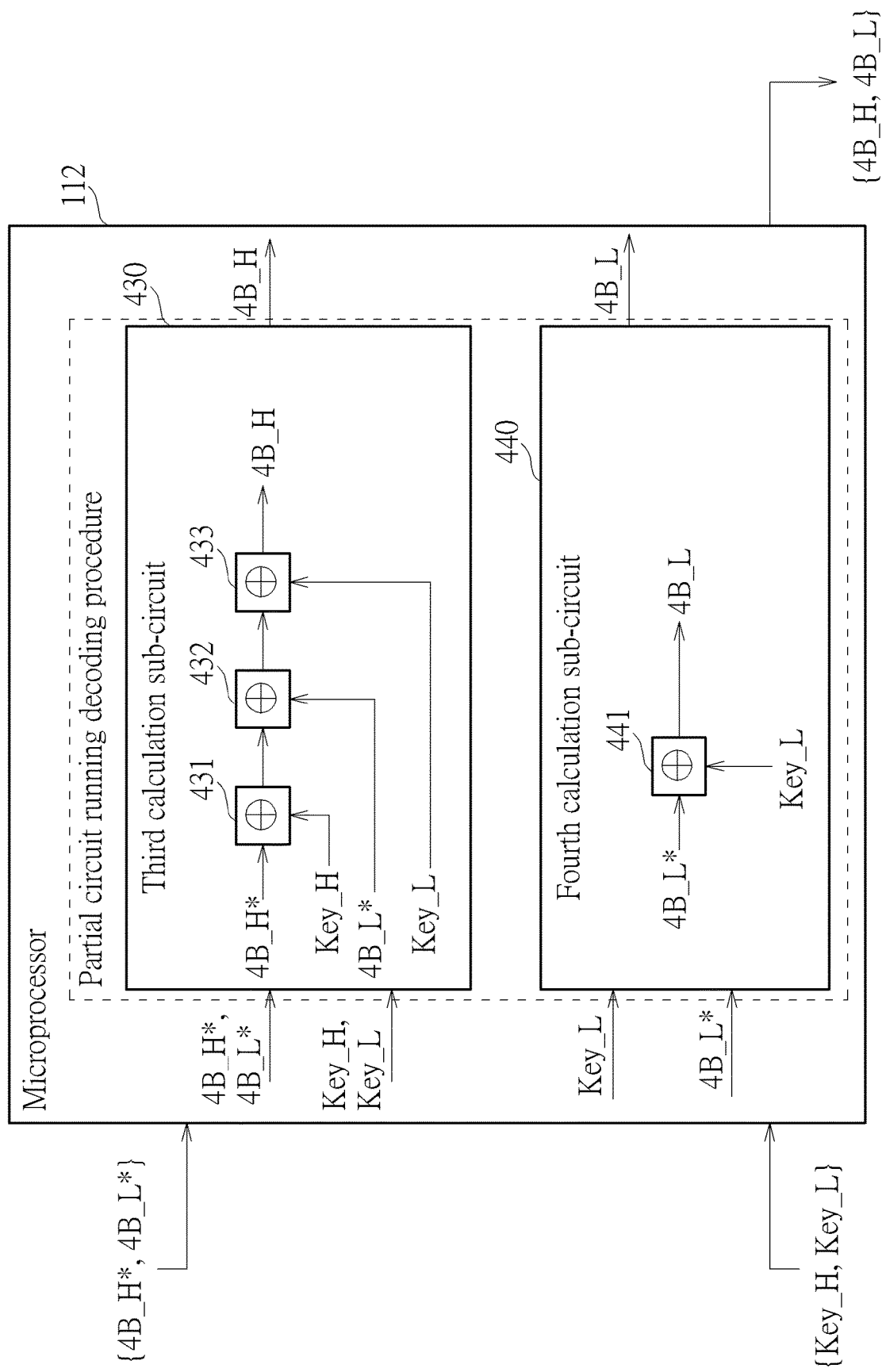
FIG. 10 illustrates a third decoding control scheme of the method for performing access management of the memory device in the HPB architecture with aid of device side table information encoding and decoding according to an embodiment of the present invention.

FIG. 10 illustrates a third decoding control scheme of the method for performing access management of the memory device in the HPB architecture with aid of device side table information encoding and decoding according to an embodiment of the present invention. When the processing circuit such as the microprocessor 112 is running the decoding procedure 112D, the aforementioned at least one partial circuit running the decoding procedure 112D within the microprocessor 112 can be configured to comprise a third calculation sub-circuit 430 and a fourth calculation sub-circuit 440, where the third calculation sub-circuit 430 may comprise multiple bitwise XOR calculation circuits such as the bitwise XOR calculation circuits 431, 432 and 433 arranged to perform bitwise XOR operations, respectively, and the fourth calculation sub-circuit 440 may comprise at least one bitwise XOR calculation circuit such as the bitwise XOR calculation circuit 441 arranged to perform a bitwise XOR operation, but the present invention is not limited thereto.

As shown in FIG. 10, the microprocessor 112 can be arranged to input the 8-bytes encoded hybrid table entry {4B_H*, 4B_L*} and the 8-bytes combined key {Key_H, Key_L} into the aforementioned at least one partial circuit running the decoding procedure 112D, and can be arranged to obtain the 8-bytes hybrid table entry {4B_H, 4B_L} from the aforementioned at least one partial circuit running the decoding procedure 112D and output the 8-bytes hybrid table entry {4B_H, 4B_L}. In addition, the third calculation sub-circuit 430 (e.g., the bitwise XOR calculation circuits 431, 432 and 433) can be arranged to perform bitwise XOR operations according to the 4-bytes encoded table entries 4B_H* and 4B_L* and the 4-bytes keys Key_H and Key_L to generate the 4-bytes table entry 4B_H, for example, according to the following equation:

$$4B\_H = 4B\_H^* \oplus Key\_H \oplus 4B\_L^* \oplus Key\_L;$$

but the present invention is not limited thereto. Additionally, the fourth calculation sub-circuit 440 (e.g., the bitwise XOR calculation circuit 441) can be arranged to perform a bitwise XOR operation according to the 4-bytes encoded table entry 4B_L* and the 4-bytes key Key_L to generate the 4-bytes table entry 4B_L, for example, according to the following equation:

$$4B\_L = 4B\_L^* \oplus Key\_L;$$

but the present invention is not limited thereto. For brevity, similar descriptions for this embodiment are not repeated in detail here.

Figure 11:
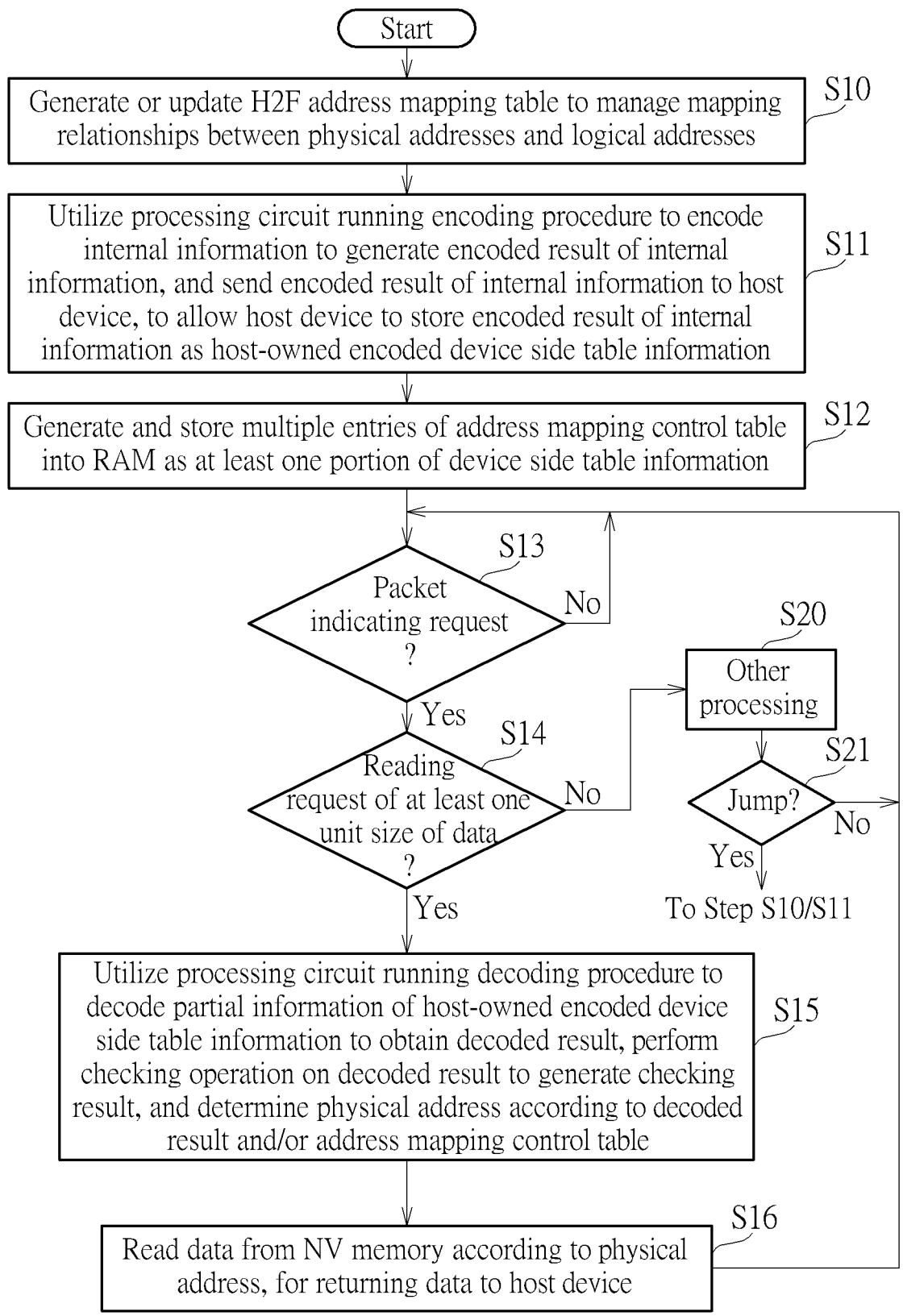
FIG. 11 illustrates a working flow of the method for performing access management of the memory device in the HPB architecture with aid of device side table information encoding and decoding according to an embodiment of the present invention.

FIG. 11 illustrates a working flow of the method for performing access management of the memory device in the HPB architecture with aid of device side table information encoding and decoding according to an embodiment of the present invention. Under control of the processing circuit such as the microprocessor 112, the memory controller 110 can operate according to the method, and more particularly, control the operations of the memory device 100 according to the method.

In Step S10, the memory controller 110 can generate or update the aforementioned at least one H2F address mapping table (e.g., the global H2F address mapping table 120T) to manage the mapping relationships between the physical addresses and the logical addresses, for controlling data access of the NV memory 120. For example, the memory controller 110 can perform garbage collection to collect valid data into one or more blank physical blocks (e.g., erased physical blocks) in the NV memory 120, and update the aforementioned at least one H2F address mapping table (e.g., the global H2F address mapping table 120T) correspondingly, but the present invention is not limited thereto.

In Step S11, the memory controller 110 can utilize the processing circuit running an encoding procedure, such as the microprocessor 112 running the encoding procedure 112E, within the memory controller 110 to encode internal information (e.g., the hybrid table HT) of the memory device 100 to generate an encoded result (e.g., the encoded hybrid table EHT) of the internal information of the memory device 100, and send the encoded result (e.g., the encoded hybrid table EHT) of the internal information of the memory device 100 to the host device 50, to allow the host device 50 to store the encoded result (e.g., the encoded hybrid table EHT) of the internal information of the memory device 100 in a memory (e.g., the RAM 56) within the host device 50 as host-owned encoded device side table information at the host device 50. For example, the host device 50 can store the encoded result such as the encoded hybrid table EHT to be the host-side table 56T.

For example, the memory controller 110 can generate the internal information (e.g., the hybrid table HT) according to the aforementioned at least one H2F address mapping table, and more particularly, load the local H2F address mapping table of the plurality of local H2F address mapping tables into the RAM 116 and add the corresponding protection information of this local H2F address mapping table (e.g., the physical address of this local H2F address mapping table, such as the latest physical address indicating the latest location where this local H2F address mapping table is stored in the NV memory 120) into the RAM 116, to generate the internal information such as the hybrid table HT, for being processed with the processing circuit such as the microprocessor 112 (e.g., the microprocessor 112 running the encoding procedure 112E). As a result, the memory controller 110 can generate the multiple encoded hybrid table entries {EHTE} of the encoded hybrid table EHT, such as the encoded versions of the multiple hybrid table entries {HTE} of the hybrid table HT, respectively, and send the multiple encoded hybrid table entries {EHTE} to the host device 50, respectively. As the memory controller 110 can generate and send the multiple encoded hybrid table entries {EHTE} to the host device 50 entry by entry, the processing circuit such as the microprocessor 112 (e.g., the microprocessor 112 running the encoding procedure 112E) can act as at least one processing unit within a processing pipeline for converting the internal information (e.g., the hybrid table HT) at the device side into the host-owned encoded device side table information at the host side.

In Step S12, the memory controller 110 can generate and store multiple entries of at least one address mapping control table (e.g., one or more address mapping control tables in one or more of the above embodiments, such as the hybrid table HT) into the RAM 116 within the memory controller 110 as at least one portion (e.g., a portion or all) of the device side table information at the memory device 100. For example, any entry of the multiple entries (e.g., the multiple hybrid table entries {HTE}) of the aforementioned at least one address mapping control table (e.g., the hybrid table HT) may comprise address information for address mapping, and the address information within the aforementioned any entry may indicate a mapping relationship between a physical address and a logical address, wherein the host-owned encoded device side table information (e.g., the multiple encoded hybrid table entries {EHTE} of the encoded hybrid table EHT, such as the encoded versions of the multiple hybrid table entries {HTE}) may comprise address information respectively carried by the multiple entries (e.g., the multiple hybrid table entries {HTE}) of the aforementioned at least one address mapping control table (e.g., the hybrid table HT).

In Step S13, the memory controller 110 can determine whether the host device 50 sends at least one packet for indicating at least one request to the memory device 100. If Yes (e.g., the memory controller 110 receives the aforementioned at least one packet from the host device 50), Step S14 is entered; if No (e.g., the memory controller 110 receives no packet from the host device 50), Step S13 is entered, in order to wait for the aforementioned at least one packet from the host device 50.

In Step S14, in response to the host device 50 sending the aforementioned at least one packet for indicating the aforementioned at least one request, the memory controller 110 can determine whether a reading request of at least one unit size of data (e.g., a request of data reading of at least one logical address/LBA, where the transfer length may be greater than or equal to one) among the aforementioned at least one request exists. The unit size may represent a predetermined unit size corresponding to a single logical address such as a single LBA, but the present invention is not limited thereto. If Yes (e.g., the reading request such as the request of data reading of at least one logical address exists, where the transfer length is greater than or equal to one), Step S15 is entered, for operating according to the reading request; if No (e.g., the reading request such as the request of data reading of at least one logical address does not exist, and more particularly, the aforementioned at least one request may comprise a non-reading request such as a writing request), Step S20 is entered, for operating according to other request(s). For example, a read command packet (e.g., the HPB READ command, more particularly, the command packet thereof) carrying at least the starting logical address and the data length of the reading request among the aforementioned at least one packet may indicate the reading request of at least one unit size of data. In this situation, the reading request of at least one unit size of data exists, and Step S15 is entered.

In Step S15, in response to the reading request corresponding to at least one logical address from the host device 50, such as the reading request (e.g., the HPB READ command) carrying the aforementioned at least one logical address (e.g., the starting logical address) and carrying partial information (e.g., the corresponding encoded hybrid table entry EHTE) of the host-owned encoded device side table information (e.g., the multiple encoded hybrid table entries {EHTE} of the encoded hybrid table EHT), the memory controller 110 can utilize the processing circuit running a decoding procedure, such as the microprocessor 112 running the decoding procedure 112D, to decode the partial information (e.g., the corresponding encoded hybrid table entry EHTE) of the host-owned encoded device side table information to obtain a decoded result (e.g., the corresponding hybrid table entry HTE) of the partial information of the host-owned encoded device side table information, perform at least one checking operation (e.g., one or more checking operations) on the decoded result of the partial information of the host-owned encoded device side table information to generate at least one checking result (e.g., one or more checking results), and determine at least one physical address associated with the aforementioned at least one logical address according to the decoded result (e.g., the corresponding hybrid table entry HTE) and/or the aforementioned at least one address mapping control table (e.g., the hybrid table HT).

Please note that the aforementioned at least one checking result may indicate whether the decoded result (e.g., the corresponding hybrid table entry HTE) of the partial information of the host-owned encoded device side table information is reliable, and the memory controller 110 can selectively use the decoded result of the partial information of the host-owned encoded device side table information to determine the aforementioned at least one physical address associated with the aforementioned at least one logical address.

For example, the aforementioned at least one checking result may indicate that the decoded result (e.g., the corresponding hybrid table entry HTE) of the partial information of the host-owned encoded device side table information is reliable. During selectively using the decoded result of the partial information of the host-owned encoded device side table information to determine the aforementioned at least one physical address associated with the aforementioned at least one logical address, in response to the aforementioned at least one checking result indicating that the decoded result of the partial information of the host-owned encoded device side table information is reliable, the memory controller 110 can use the decoded result (e.g., the corresponding hybrid table entry HTE) of the partial information of the host-owned encoded device side table information to determine the aforementioned at least one physical address associated with the aforementioned at least one logical address. More particularly, the decoded result (e.g., the corresponding hybrid table entry HTE) of the partial information of the host-owned encoded device side table information may comprise the aforementioned at least one physical address associated with the aforementioned at least one logical address.

For another example, the aforementioned at least one checking result may indicate that the decoded result (e.g., the corresponding hybrid table entry HTE) of the partial information of the host-owned encoded device side table information is not reliable. During selectively using the decoded result of the partial information of the host-owned encoded device side table information to determine the aforementioned at least one physical address associated with the aforementioned at least one logical address, in response to the aforementioned at least one checking result indicating that the decoded result of the partial information of the host-owned encoded device side table information is not reliable, the memory controller 110 can prevent using the decoded result (e.g., the corresponding hybrid table entry HTE) of the partial information of the host-owned encoded device side table information to determine the aforementioned at least one physical address associated with the aforementioned at least one logical address, and more particularly, determine the aforementioned at least one physical address associated with the aforementioned at least one logical address according to the aforementioned at least one address mapping control table (e.g., the hybrid table HT) rather than the decoded result of the partial information of the host-owned encoded device side table information.

In Step S16, the memory controller 110 can read data corresponding to the reading request from the NV memory 120 according to the aforementioned at least one physical address, for returning the data to the host device 50.

In Step S20, the memory controller 110 can perform other processing corresponding to the other request(s). For example, in response to the host device 50 sending the at least one packet for indicating the at least one request, the memory controller 110 determines whether a writing request among the at least one request exists. When the writing request among the at least one request exists, the memory controller 110 can perform data writing (e.g., data programming) on the NV memory 120, and update the aforementioned at least one H2F address mapping table (e.g., the global H2F address mapping table 120T, and more particularly, one or more of the plurality of local H2F address mapping tables) correspondingly, for indicating at least one latest mapping relationship between at least one physical address and at least one logical address of the data writing.

In Step S21, the memory controller 110 can determine whether to jump to a previous step such as any of Steps S10 and S11. For example, when determining that updating the aforementioned at least one H2F address mapping table is needed, the memory controller 110 can jump to Step S10. For another example, when determining that sending the encoded result of the latest version of the internal information of the memory device 100 to the host device 50 is needed (e.g., the internal information such as the hybrid table HT is changed or updated), the memory controller 110 can jump to Step S11. For brevity, similar descriptions for this embodiment are not repeated in detail here.

For better comprehension, the method may be illustrated with the working flow shown in FIG. 11, but the present invention is not limited thereto. According to some embodiments, one or more steps may be added, deleted, or changed in the working flow shown in FIG. 11.

According to some embodiments, the decoded result of the partial information of the host-owned encoded device side table information may comprise at least one entry (e.g., the corresponding hybrid table entry HTE) corresponding to the aforementioned at least one logical address (e.g., the starting logical address) among the multiple entries (e.g., the multiple hybrid table entries {HTE}) of the aforementioned at least one address mapping control table (e.g., the hybrid table HT), such as the $i^{th}$ hybrid table entry HTE(i) among the multiple hybrid table entries {HTE}. During performing the aforementioned at least one checking operation on the decoded result of the partial information of the host-owned encoded device side table information to generate the aforementioned at least one checking result, the memory controller 110 can perform a first checking operation among the aforementioned at least one checking operation on first protection information within a first entry (e.g., the $i^{th}$ hybrid table entry HTE(i)) among the aforementioned at least one entry corresponding to the aforementioned at least one logical address, such as the table entry TE2(i) within the $i^{th}$ hybrid table entry HTE(i), to generate a first checking result among the aforementioned at least one checking result, where a first field (e.g., the field of the table entry TE1) and a second field (e.g., the field of the table entry TE2) of the first entry (e.g., the $i^{th}$ hybrid table entry HTE(i)) may carry first mapping information (e.g., the table entry TE1(i)) and the first protection information (e.g., the table entry TE2(i)), respectively, and the first checking result may indicate whether the first mapping information (e.g., the table entry TE1(i)) is reliable, for indicating whether the decoded result (e.g., the corresponding hybrid table entry HTE) of the partial information (e.g., the corresponding encoded hybrid table entry EHTE) of the host-owned encoded device side table information (e.g., the encoded hybrid table EHT) is reliable. For the case that the decoded result of the partial information of the host-owned encoded device side table information is reliable, the first mapping information (e.g., the table entry TE1(i)) can be a first physical address (e.g., the aforementioned associated physical address corresponding to the starting logical address), and the first protection information (e.g., the table entry TE2(i)) can be a second physical address related to the at least one address mapping control table, such as the physical address of the local H2F address mapping table. For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing access management of a memory device in a Host Performance Booster (HPB) architecture with aid of device side table information encoding and decoding, the method being applied to a memory controller of the memory device, the memory device comprising the memory controller and a non-volatile (NV) memory, the NV memory comprising at least one NV memory element, the method comprising:

utilizing a processing circuit running an encoding procedure within the memory controller to encode internal information of the memory device to generate an encoded result of the internal information of the memory device, and sending the encoded result of the internal information of the memory device to a host device, to allow the host device to store the encoded result of the internal information of the memory device in a memory within the host device as host-owned encoded device side table information at the host device;

generating and storing multiple entries of at least one address mapping control table into a random access memory (RAM) within the memory controller as at least one portion of device side table information at the memory device, wherein any entry of the multiple entries of the at least one address mapping control table comprises address information for address mapping, and the address information within said any entry indicates a mapping relationship between a physical address and a logical address, wherein the host-owned encoded device side table information comprises address information respectively carried by the multiple entries of the at least one address mapping control table;

in response to a reading request corresponding to at least one logical address from the host device, utilizing the processing circuit running a decoding procedure within the memory controller to decode partial information of the host-owned encoded device side table information to obtain a decoded result of the partial information of the host-owned encoded device side table information, performing at least one checking operation on the decoded result of the partial information of the host-owned encoded device side table information to generate at least one checking result, and selectively using the decoded result of the partial information of the host-owned encoded device side table information to determine at least one physical address associated with the at least one logical address, wherein the reading request carries the partial information of the host-owned encoded device side table information, and the at least one checking result indicates whether the decoded result of the partial information of the host-owned encoded device side table information is reliable, wherein the decoded result of the partial information of the host-owned encoded device side table information comprises at least one entry corresponding to the at least one logical address among the multiple entries, and performing the at least one checking operation on the decoded result of the partial information of the host-owned encoded device side table information to generate the at least one checking result further comprises:

performing a first checking operation among the at least one checking operation on first protection information within a first entry among the at least one entry corresponding to the at least one logical address to generate a first checking result among the at least one checking result, wherein a first field and a second field of the first entry carry first mapping information and the first protection information, respectively, and the first checking result indicates whether the first mapping information is reliable, for indicating whether the decoded result of the partial information of the host-owned encoded device side table information is reliable;

wherein the first mapping information is a first physical address, and the first protection information is a second physical address related to the at least one address mapping control table; and reading data corresponding to the reading request from the NV memory according to the at least one physical address, for returning the data to the host device.

2. The method of claim 1, wherein the at least one checking result indicates that the decoded result of the partial information of the host-owned encoded device side table information is reliable; and selectively using the decoded result of the partial information of the host-owned encoded device side table information to determine the at least one physical address associated with the at least one logical address further comprises:

in response to the at least one checking result indicating that the decoded result of the partial information of the host-owned encoded device side table information is reliable, using the decoded result of the partial information of the host-owned encoded device side table information to determine the at least one physical address associated with the at least one logical address.

3. The method of claim 2, wherein the decoded result of the partial information of the host-owned encoded device side table information comprises the at least one physical address associated with the at least one logical address.

4. The method of claim 1, wherein the at least one checking result indicates that the decoded result of the partial information of the host-owned encoded device side table information is not reliable; and selectively using the decoded result of the partial information of the host-owned encoded device side table information to determine the at least one physical address associated with the at least one logical address further comprises:

in response to the at least one checking result indicating that the decoded result of the partial information of the host-owned encoded device side table information is not reliable, preventing using the decoded result of the partial information of the host-owned encoded device side table information to determine the at least one physical address associated with the at least one logical address.

5. The method of claim 4, wherein selectively using the decoded result of the partial information of the host-owned encoded device side table information to determine the at least one physical address associated with the at least one logical address further comprises:

in response to the at least one checking result indicating that the decoded result of the partial information of the host-owned encoded device side table information is not reliable, determining the at least one physical address associated with the at least one logical address according to the at least one address mapping control table rather than the decoded result of the partial information of the host-owned encoded device side table information.

6. The method of claim 1, wherein the internal information of the memory device comprises multiple hybrid table entries, and the encoded result of the internal information of the memory device comprises multiple encoded hybrid table entries; and one encoded table entry among multiple encoded table entries within an $i^{th}$ encoded hybrid table entry of the multiple encoded hybrid table entries is equal to a function of all table entries among multiple table entries within an $i^{th}$ hybrid table entry as well as one predetermined key among a first predetermined key and a second predetermined key, and another encoded table entry among the multiple encoded table entries within the $i^{th}$ encoded hybrid table entry is equal to a function of at least one table entry among the multiple table entries within the $i^{th}$ hybrid table entry as well as another predetermined key among the first predetermined key and the second predetermined key, wherein i represents a non-negative integer.

7. A memory device, comprising:
a non-volatile (NV) memory, arranged to store information, wherein the NV memory comprises at least one NV memory element; and
a controller, coupled to the NV memory, arranged to control operations of the memory device, wherein the controller comprises:
  a processing circuit, arranged to control the controller according to a plurality of host commands from a host device, to allow the host device to access the NV memory through the controller; and
  a random access memory (RAM), coupled to the processing circuit, arranged to provide the controller with internal storage space;

wherein:
the controller utilizes the processing circuit running an encoding procedure within the controller to encode internal information of the memory device to generate an encoded result of the internal information of the memory device, and sends the encoded result of the internal information of the memory device to the host device, to allow the host device to store the encoded result of the internal information of the memory device in a memory within the host device as host-owned encoded device side table information at the host device;
the controller generates and stores multiple entries of at least one address mapping control table into the RAM within the controller as at least one portion of device side table information at the memory device, wherein any entry of the multiple entries of the at least one address mapping control table comprises address information for address mapping, and the address information within said any entry indicates a mapping relationship between a physical address and a logical address, wherein the host-owned encoded device side table information comprises address information respectively carried by the multiple entries of the at least one address mapping control table;
in response to a reading request corresponding to at least one logical address from the host device, the controller utilizes the processing circuit running a decoding procedure within the controller to decode partial information of the host-owned encoded device side table information to obtain a decoded result of the partial information of the host-owned encoded device side table information, performs at least one checking operation on the decoded result of the partial information of the host-owned encoded device side table information to generate at least one checking result, and selectively uses the decoded result of the partial information of the host-owned encoded device side table information to determine at least one physical address associated with the at least one logical address, wherein the reading request carries the partial information of the host-owned encoded device side table information, and the at least one checking result indicates whether the decoded result of the partial information of the host-owned encoded device side table information is reliable, wherein the decoded result of the partial information of the host-owned encoded device side table information comprises at least one entry corresponding to the at least one logical address among the multiple entries, and performing the at least one checking operation on the decoded result of the partial information of the host-owned encoded device side table information to generate the at least one checking result further comprises:
  performing a first checking operation among the at least one checking operation on first protection information within a first entry among the at least one entry corresponding to the at least one logical address to generate a first checking result among the at least one checking result, wherein a first field and a second field of the first entry carry first mapping information and the first protection information, respectively, and the first checking result indicates whether the first mapping information is reliable, for indicating whether the decoded result of the partial information of the host-owned encoded device side table information is reliable;
wherein the first mapping information is a first physical address, and the first protection information is a second physical address related to the at least one address mapping control table; and
the controller reads data corresponding to the reading request from the NV memory according to the at least one physical address, for returning the data to the host device.

8. An electronic device comprising the memory device of claim 7, and further comprising:
the host device, coupled to the memory device, wherein the host device comprises:
at least one processor, arranged for controlling operations of the host device; and
a power supply circuit, coupled to the at least one processor, arranged for providing power to the at least one processor and the memory device;
wherein the memory device provides the host device with storage space.

9. A controller of a memory device, the memory device comprising the controller and a non-volatile (NV) memory, the NV memory comprising at least one NV memory element, the controller comprising:
a processing circuit, arranged to control the controller according to a plurality of host commands from a host device, to allow the host device to access the NV memory through the controller; and
a random access memory (RAM), coupled to the processing circuit, arranged to provide the controller with internal storage space;
wherein:
the controller utilizes the processing circuit running an encoding procedure within the controller to encode internal information of the memory device to generate an encoded result of the internal information of the memory device, and sends the encoded result of the internal information of the memory device to the host device, to allow the host device to store the encoded result of the internal information of the memory device in a memory within the host device as host-owned encoded device side table information at the host device;
the controller generates and stores multiple entries of at least one address mapping control table into the RAM within the controller as at least one portion of device side table information at the memory device, wherein any entry of the multiple entries of the at least one address mapping control table comprises address information for address mapping, and the address information within said any entry indicates a mapping relationship between a physical address and a logical address, wherein the host-owned encoded device side table information comprises address information respectively carried by the multiple entries of the at least one address mapping control table;
in response to a reading request corresponding to at least one logical address from the host device, the controller utilizes the processing circuit running a decoding procedure within the controller to decode partial information of the host-owned encoded device side table information to obtain a decoded result of the partial information of the host-owned encoded device side table information, performs at least one checking operation on the decoded result of the partial information of the host-owned encoded device side table information to generate at least one checking result, and selectively uses the decoded result of the partial information of the host-owned encoded device side table information to determine at least one physical address associated with the at least one logical address, wherein the reading request carries the partial information of the host-owned encoded device side table information, and the at least one checking result indicates whether the decoded result of the partial information of the host-owned encoded device side table information is reliable, wherein the decoded result of the partial information of the host-owned encoded device side table information comprises at least one entry corresponding to the at least one logical address among the multiple entries, and performing the at least one checking operation on the decoded result of the partial information of the host-owned encoded device side table information to generate the at least one checking result further comprises:
performing a first checking operation among the at least one checking operation on first protection information within a first entry among the at least one entry corresponding to the at least one logical address to generate a first checking result among the at least one checking result, wherein a first field and a second field of the first entry carry first mapping information and the first protection information, respectively, and the first checking result indicates whether the first mapping information is reliable, for indicating whether the decoded result of the partial information of the host-owned encoded device side table information is reliable;
wherein the first mapping information is a first physical address, and the first protection information is a second physical address related to the at least one address mapping control table; and
the controller reads data corresponding to the reading request from the NV memory according to the at least one physical address, for returning the data to the host device.

* * * * *